United States Patent
Demant et al.

(10) Patent No.: US 8,589,883 B2
(45) Date of Patent: Nov. 19, 2013

(54) AUTOMATION OF TESTING FOR USER INTERFACE APPLICATIONS

(75) Inventors: Hilmar Demant, Karlsdorf (DE);
Sebastian Droll, Heidelberg (DE);
Joachim Fitzer, Schriesheim (DE);
Ioannis Grammatikakis, Maxdorf (DE); Jan Heiler, Walldorf (DE); Rolf Krane, Wiesloch (DE); Juergen Sattler, Wiesloch (DE); Frank Schertel, Mannheim (DE); Markus Viol, Walldorf (DE); Thorsten Weber, Mannheim (DE)

(73) Assignee: SAP AG, Walldorf (DE)

( * ) Notice: Subject to any disclaimer, the term of this patent is extended or adjusted under 35 U.S.C. 154(b) by 589 days.

(21) Appl. No.: 12/841,832

(22) Filed: Jul. 22, 2010

(65) Prior Publication Data
US 2012/0023484 A1     Jan. 26, 2012

(51) Int. Cl.
*G06F 9/44* (2006.01)

(52) U.S. Cl.
USPC ............ 717/124; 717/115; 717/125; 717/126

(58) Field of Classification Search
None
See application file for complete search history.

(56) References Cited

U.S. PATENT DOCUMENTS

| | | | | |
|---|---|---|---|---|
| 7,627,854 B2 * | 12/2009 | Burner et al. | ................. | 717/115 |
| 7,849,447 B1 * | 12/2010 | Karis et al. | .................... | 717/125 |
| 7,934,200 B2 * | 4/2011 | Liu | ............................... | 717/124 |
| 7,979,846 B2 * | 7/2011 | Grechanik et al. | ............ | 717/124 |
| 8,196,112 B1 * | 6/2012 | Cansizlar | ...................... | 717/126 |
| 8,271,950 B2 * | 9/2012 | Bharadwaj | ..................... | 717/124 |
| 8,370,811 B2 * | 2/2013 | Grechanik et al. | ............ | 717/125 |
| 8,402,434 B2 * | 3/2013 | Mclean | ......................... | 717/115 |
| 8,458,662 B2 * | 6/2013 | Grechanik et al. | ............ | 717/124 |
| 8,473,914 B2 * | 6/2013 | Bergman et al. | .............. | 717/124 |
| 2008/0295076 A1 * | 11/2008 | McKain et al. | ............... | 717/124 |

OTHER PUBLICATIONS

Rodrigues et al., Using a script model to preserve the consistency within an UI design environment, Sep. 2005, 7 pages.*
Vieira et al., Automation of GUI testing using a model-driven approach, May 2006, 6 pages.*
Grechanik et al., Maintaining and evolving GUI-directed test scripts, May 2009, 11 pages.*

* cited by examiner

*Primary Examiner* — Thuy Dao
(74) *Attorney, Agent, or Firm* — Brake Hughes Bellermann LLP

(57) ABSTRACT

A host software application implementing business processes and providing a graphical display associated with a user interface (UI) for a user in a client program executing on a client frontend device that is separate from a backend device storing metadata associated with the UI may be initiated. An automation graphical symbol may provide the user with an option to initiate a test on events of the host software application, during execution of the host software application. A request from the user may be received, to initiate a test on events of the host software application. Information may be received from the user indicating one or more selected specific events for performing the test. The test may be initiated on the selected specific events, based on a state of execution of the host software application at an initial time of the user indicating the selected specific events for performing the test.

14 Claims, 27 Drawing Sheets

AUTOMATION OF TESTING FOR USER INTERFACE APPLICATIONS

TECHNICAL FIELD

This description relates to automation of testing for applications associated with user interfaces at client devices.

BACKGROUND

Many businesses and organizations may utilize services (e.g., software applications) that may be provided by one or more providers that may offer user interfaces (UIs) for accessing applications that may be customized for a particular user. For example, a user may desire access via a frontend client device to customer invoice applications that are customized to that particular user. As other examples, the user may also desire access to applications for managing customer relationships, financial management, management of projects, management of supply chain networks, management of supplier relationships, support for executive management, and management of compliance with laws and regulations. Customization may be furnished by the provider, or the user may have a capability to customize particular aspects of an application or service. Further, the provider may host the software and associated data on one or more provider backend devices including host servers. The users may then access the services via remote connections (e.g., via the Internet) using various client frontend devices (e.g., a server local to the user with connecting devices, desktop computers, laptop computers, handheld devices, etc.). The users may then be able to access powerful functionality (e.g., business processes) without requiring a significant up-front investment by the user in extensive Information Technology (IT) personnel and equipment, for example, as part of the user's business setup.

However, in accessing such services via remote connections, a significant amount of processing resources may be consumed (e.g., processor time, bandwidth) by transporting service information (e.g., software and data) between the backend and the frontend devices. For example, if a user enters data into a form displayed on a client device, and the information needs to be transported to the backend for processing for each entered value in various fields, the overhead for supporting round-trip data transports may become significant. Further, if a user such as a developer needs to test various processes to ensure that they will execute properly when needed by a user, the test results may become somewhat unreliable due to the added overhead of computing via several layers, between the backend and the client device.

SUMMARY

According to one general aspect, a user interface manager may be configured to initiate execution of a host software application implementing one or more business processes and providing a graphical display associated with a user interface (UI) for a user in a client program executing on a client frontend device that is separate from a backend device storing metadata associated with the UI. An automation trigger display engine may be configured to display an automation graphical symbol within the graphical display providing the user with an option to initiate a test on one or more events of the host software application, during execution of the host software application. An automation controller input engine may be configured to receive a request from the user, via an action associated with the automation graphical symbol, to initiate a test on one or more events of the host software application. An event selection engine may be configured to receive information from the user indicating one or more selected specific events for performing the test. An automation explorer engine may be configured to initiate the test on the selected specific events, based on a state of execution of the host software application at an initial time of the user indicating the selected specific events for performing the test.

One or more implementations may include the following features. For example, the user interface manager may be configured to initiate execution of the host software application implementing one or more business processes and providing a graphical display associated with the user interface (UI) for the user in a client program including a browser, the host software application executing in one of Silverlight, Flash, Java, and ASP.NET on the client frontend device. As another example, the user interface manager may be configured to receive a model of the UI from a metadata repository located at the backend device, and interpret the model of the UI for execution by the client program.

As another example, the event selection engine may be configured to receive a request to record one or more events occurring during execution of the host software application by the user. The automation explorer engine may be configured to request storage of the recorded events as a script in a script database located at the backend device, and request storage of data associated with the recorded events at the time of recording the respective events. As a further example, the automation explorer engine may be configured to retrieve the script of recorded events and the data associated with the recorded events from a script database located at the backend device, and initiate execution of the script to generate test results for the user.

As yet another example, the event selection engine may be configured to receive a request to retrieve from a script database located on the backend device one or more scripts that include events that occur during execution of the host software application and data associated with the events.

According to another general aspect, a computer program product may be tangibly embodied on a computer-readable medium and may include executable code that, when executed, is configured to cause at least one data processing apparatus to perform the following operations. Specifically, the executable code may cause the data processing apparatus to initiate execution of a host software application implementing one or more business processes and providing a graphical display associated with a user interface (UI) for a user in a client program executing on a client frontend device that is separate from a backend device storing metadata associated with the UI. The instructions may further cause the data processing apparatus to display an automation graphical symbol within the graphical display providing the user with an option to initiate a test on one or more events of the host software application, during execution of the host software application. The instructions may cause the data processing apparatus to receive a request from the user, via an action associated with the automation graphical symbol, to initiate a test on one or more events of the host software application. The instructions may cause the data processing apparatus to receive information from the user indicating one or more selected specific events for performing the test. The instructions may cause the data processing apparatus to initiate the test on the selected specific events, based on a state of execution of the host software application at an initial time of the user indicating the selected specific events for performing the test.

One or more implementations may include the following features. For example, initiating execution of the host software application may include initiating execution of the software application implementing one or more business processes and providing a graphical display associated with a user interface (UI) for a user in a client program including a browser, the host software application executing in one of Silverlight, Flash, Java, and ASP.NET on a client frontend device. As another example, initiating execution of the host software application may include receiving a model of the UI from a metadata repository located at the backend device, and interpreting the model of the UI for execution by the client program.

As another example, receiving information from the user indicating one or more selected specific events may include receiving a request to record one or more events occurring during execution of the host software application by the user, requesting storage of the recorded events as a script in a database located at the backend device, and requesting storage of data associated with the recorded events at the time of recording the respective events. As a further example, initiating the test on the selected specific events may include retrieving the script of recorded events and the data associated with the recorded events from a script database located at the backend device, and initiating execution of the script to generate test results for the user.

As another example, receiving information from the user indicating one or more selected specific events may include receiving a request to retrieve from a script database located on the backend device one or more scripts that include events that occur during execution of the host software application and data associated with the events.

As another example, the executable code, when executed, may cause the at least one data processing apparatus to determine whether the selected specific events raise one or more error conditions, and display error messages associated with determined error conditions.

According to another general aspect, a client engine may be configured to initiate execution of a frontend software application that provides a graphical display associated with a script composer for a user, in a client program executing on a client frontend device, and display a script graphical symbol within the graphical display providing the user with an option to select scripts including one or more events that occur during execution of a hosted software application. An automation center engine may include a script composer engine and an automation explorer engine. The script composer engine may be configured to generate a scenario including a start event and an end event, generating the scenario including receiving a request from the user, via an action associated with the script graphical symbol, to select a first script, and obtaining the selected first script and associating the selected first script with a first selected script graphical symbol displayed within the graphical display. The automation explorer engine may be configured to initiate a test on the generated scenario.

One or more implementations may include the following features. For example, the composer engine may be configured to obtain the selected first script based on retrieving the selected first script from a database located at a backend device. For example, the automation center engine may include a recorder engine configured to record one or more events occurring during execution of the host software application by the user on the client frontend device, and receive a request to store the recorded events as a script. Further, the automation explorer engine may be configured to store the recorded events as a script in a database located at the backend device, and store data associated with the recorded events at the time of recording the respective events.

As another example, the script composer engine may be configured to associate a role value with the first script.

As another example, the script composer engine may be configured to receive a request from the user, via an action associated with the script graphical symbol, to select a second script, obtain the selected second script and associate the selected second script with a second selected script graphical symbol displayed within the graphical display, and receive an input from the user requesting a display of a graphical connector symbol indicating a connection of an output graphical symbol on the first selected script graphical symbol to an input graphical symbol within the graphical display.

As another example, the script composer engine may be configured to receive a request from the user, via an action associated with a conditional graphical symbol, to select a conditional step for inclusion in the scenario, receive input values from the user indicating actions associated with a plurality of conditions associated with the conditional step, and store the input values in association with the conditional step in a database.

As yet another example, the script composer engine may be configured to display data graphical symbols associated with displayed script graphical symbols in a data pool display area within the graphical display, and display respective input indicators and output indicators on each data graphical symbol when the user moves a cursor over a graphical symbol included in the displayed scenario that is associated with the respective data graphical symbol.

The details of one or more implementations are set forth in the accompanying drawings and the description below. Other features will be apparent from the description and drawings, and from the claims.

DETAILED DESCRIPTION

Figure 1:
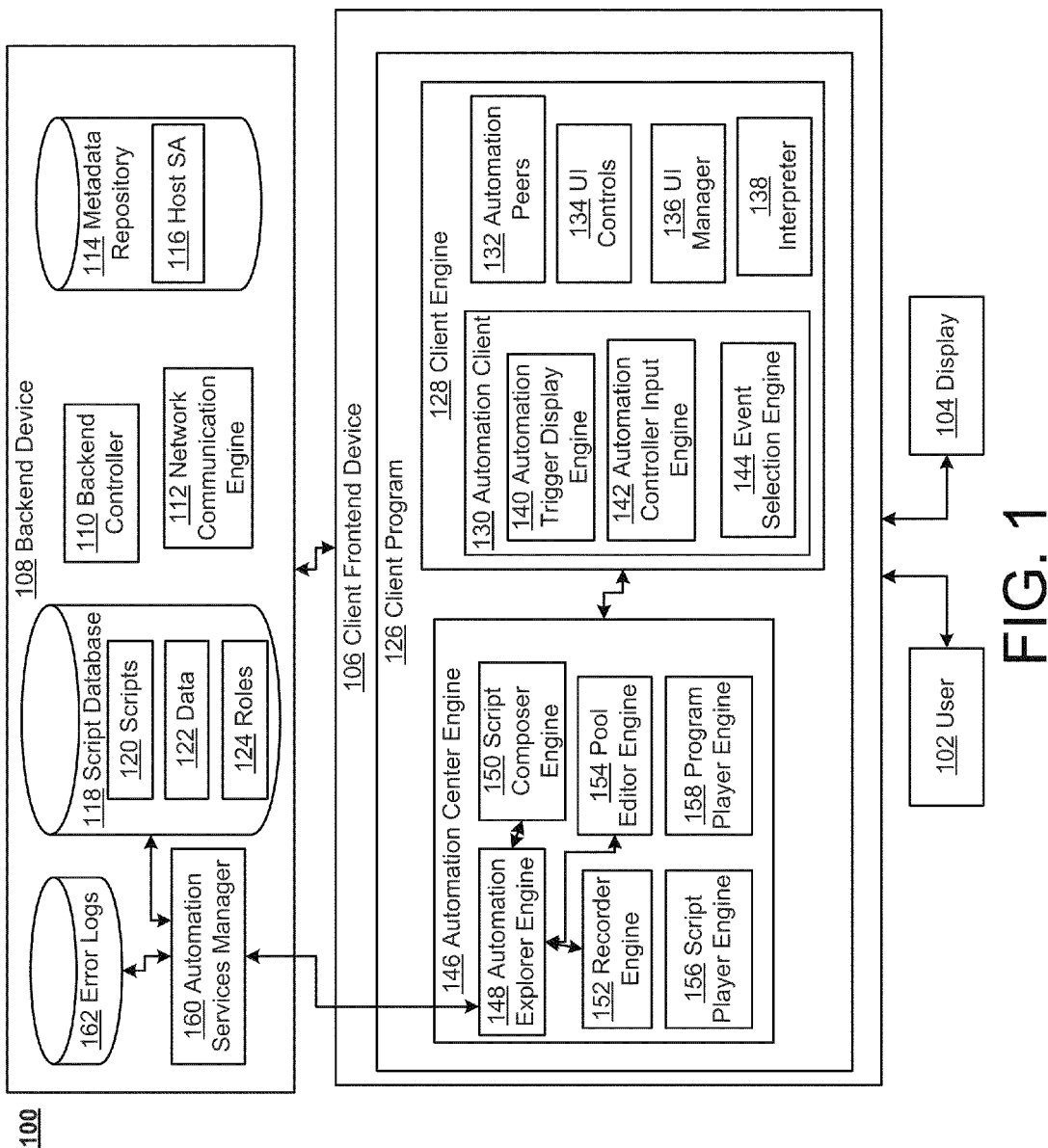
FIG. 1 is a block diagram of a system for automated testing of applications associated with user interfaces at a client device.

FIG. 1 is a block diagram of a system 100 for automated testing of applications associated with user interfaces at a client device. Many businesses and organizations may utilize services (e.g., software applications) that may be provided by one or more providers that may offer user interfaces (UIs) for accessing applications that may be customized for a particular user. For example, a user may desire access via a frontend client device to customer invoice applications that are customized to that particular user. As other examples, the user may also desire access to applications for managing customer relationships, financial management, management of projects, management of supply chain networks, management of supplier relationships, support for executive management, and management of compliance with laws and regulations. Customization may be furnished by the provider, or the user may have a capability to customize particular aspects of an application or service. Further, the provider may host the software and associated data on one or more provider backend devices including host servers. The users may then access the services via remote connections (e.g., via the Internet) using various client frontend devices (e.g., a server local to the user with connecting devices, desktop computers, laptop computers, handheld devices, etc.). The users may then be able to access powerful functionality (e.g., business processes) without requiring a significant up-front investment by the user in extensive Information Technology (IT) personnel and equipment, for example, as part of the user's business setup.

In the example of FIG. 1, the system 100 allows a user to generate and run tests on applications associated with UIs, on client devices. By generating and running such tests in a client program such as a browser application on the client device, the user may obtain results faster and more efficiently than testing that may be generated and run on a backend server.

In FIG. 1, one or more users 102 may use a display device 104 while connected locally to a client frontend device 106 to use and test user interface applications that may be stored and served from a backend device 108. A backend controller 110 may manage operations on the backend device 108, and a network communication engine 112 may manage communication between the backend device 108 and the frontend device 106, via a network protocol, e.g., Hypertext Transfer Protocol (HTTP) or Hypertext Transfer Protocol Secure (HTTPS).

A metadata repository 114 may store information related to the UIs, such as metadata representations of the UIs that may be sent to client frontend devices for interpretation for executing the UIs on the client frontend devices 106. Since the UI information is stored on the backend device 108, one or more representations of UIs may be viewed (as an aggregate of the UI's metadata) as a host software application 116 that is downloaded to client frontend devices 106 for interpretation and execution. According to an example embodiment, the UI metadata may be implemented in eXtensible Markup Language (XML), and may include descriptive data such as processes to be executed, display information such as buttons, data entry fields, display fields, and information related to input/output data associated with the UI. Role information may also be stored with the metadata (e.g., a role of manager may be required for execution of a UI by a user).

A script database 118 may be used, for example, by a testing system, to store scripts 120, data 122, and roles 124. The scripts 120 may include process code for various activities a user may want to perform, for example, for business processes. The scripts 120 may be generated automatically (e.g., by a user executing UI models simultaneously with the recording of the script), or they may be generated via line-by-line input of code by a user 102. The data 122 and roles 124 may be stored separately from the scripts 120, as the scripts may be loosely bound to certain entities, such as global variables. The data 122 may include data that may be input and or output for any of the scripts 120, and relationships between the individual scripts 120 and data 122 and roles 124 may be stored with the scripts 120. The roles 124 may be used for indicating particular entities that may be associated with certain scripts 120. For example, a manager role may be assigned to a script 120 that embodies an approval of a business transaction, while an employee role may be assigned to a script that embodies a business process for filling out a sales order. While these entities may be described in terms of business processes, it is to be understood that these entities may also be used in other situations besides management of business functions.

The client frontend device 106 may include a client program 126 that may be used for executing processes associated with the UIs, for sending information to the user 102, for receiving input from the user 102, and for displaying images on the display 104 for the user, as well as managing a flow of information between the browser 126 and the backend device 108. For example, the client program may include a browser, such as Internet Explorer, Firefox, or Chrome. For example, a browser may include a plugin such as Microsoft Silverlight to handle execution of the processes associated with the UIs and displaying information on the display 104 for the user 102. Such a client program or browser plugin may include a graphical subsystem for rendering user interfaces in Windows-based applications, which may provide a consistent programming model for building applications and provide a clear separation between the user interface and business logic. Using such a browser plugin, for example, may eliminate a need for a Java stack (e.g., a Java J2EE server stack) for execution of processes on the client frontend device 106, thereby providing an environment using a more lean stack for execution and communication. Such an environment may provide a more efficient and more timely execution of processes related to the needs of the user 102. In an example implementation, the client program 126 may be run independently of a browser. Other applications that may be used may include ASP.NET, Flash, or Java (e.g., Java EE 6).

A client engine 128 may include an automation client 130, automation peers 132, UI controls 134, a UI manager 136, and an interpreter 138. The automation client 130 is configured to perform the automated testing of UIs on the client frontend device 106, as discussed further below. The automation peers 132 include information that may describe what is possible in following particular paths of execution (e.g., via a tree-type structure) for traversal of scripts and business processes to verify a valid path of traversal. For example, decisions may be based on whether a get value or a set value operation may be performed, and whether a next object may be accessed.

In an example implementation, the automation peers 132 may be implemented via a .NET framework feature wherein classes may utilize an IAutomationPeer Interface which exposes the running instances by a standard to external automation tools. The automation peer composition tree may include a condensed, aggregated or extended view of a physical control tree and may expose the composition such that an appropriate external view is provided to other tools.

The UI controls 134 may be configured to manage control structures related to the UI (e.g., input fields, drop boxes, tables, charts, etc.). The UI manager 136 may be configured to manage interpretation of the UIs via the interpreter 138, as well as any input and output between the UIs and the user 102 or operations between the UI and the backend device 108. For example, the UI manager 136 may receive a metadata representation of a UI, and may request its interpretation via the interpreter 138 so that a graphical display may be rendered on the display device 104 for interaction with the user 102.

The automation client 130, which may be integrated into the client engine 128 with the UI manager 136, may include an automation trigger display engine 140, an automation controller input engine 142, and an event selection engine 144, which are discussed in more detail below.

An automation center engine 146 manages the automation of testing of scripts and processes such as business processes associated with the UIs. According to an example embodiment, the user interface manager 136 may be configured to initiate execution of a host software application (e.g., the host software application 116) implementing one or more business processes and providing a graphical display associated with a user interface (UI) for the user 102 in the client program 126 executing on the client frontend device 106 that is separate from the backend device 108 storing metadata associated with the UI (e.g., in the metadata repository 114).

According to an example embodiment, the automation trigger display engine 140 may be configured to display an automation graphical symbol within the graphical display providing the user 102 with an option to initiate a test on one or more events of the host software application 116, during execution of the host software application 116. For example, a button labeled "Automation" may be displayed within the graphical display of UI operations to provide the user 102 with a clickable icon for requesting a test on one or more processes included in a UI. The user 102 may desire the test to ensure that certain activities are valid according to the design of the UI, or the user 102 may wish to view progress of execution of steps within the process (e.g., inputs and outputs) to ensure that execution is correct and efficient. The automation controller input engine 142 may be configured to receive a request from the user 102, via an action associated with the automation graphical symbol, to initiate a test on one or more events of the host software application 116. For example, the user 102 may click on an "Automation" button to request the test.

According to an example embodiment, the event selection engine 144 may be configured to receive information from the user 102 indicating one or more selected specific events for performing the test. According to an example embodiment, an automation center engine 146 may include an automation explorer engine 148 configured to initiate the test on the selected specific events, based on a state of execution of the host software application 116 at an initial time of the user 102 indicating the selected specific events for performing the test. For example, the user 102 may wish to test a process associated with a UI for an employee entering data in a sales order. For example, the user may wish to execute the UI and simultaneously record a script for testing, or may wish to assemble a string of scripts as a scenario for testing, or the user may wish to code a script line-by-line for batch testing. As another example, the user may wish to retrieve a script or scenario that was previously saved in the backend device 108 (or the frontend device 106) and run a test on the script or scenario, possibly making edits to the script or scenario to test various aspects of execution.

According to an example embodiment, the user interface manager 136 may be configured to initiate execution of the host software application 116 implementing one or more business processes and providing a graphical display associated with the user interface (UI) for the user 102 in a client program including a browser (e.g., client program 126), the host software application 116 executing in one of Silverlight, Flash, Java, and ASP.NET on the client frontend device 106.

According to an example embodiment, the user interface manager 136 may be configured to receive a model of the UI from a metadata repository located at the backend device (e.g., metadata repository 114), and interpret the model of the UI for execution by the client program 126 (e.g., via the interpreter 138).

According to an example embodiment, the event selection engine 144 may be configured to receive a request to record one or more events occurring during execution of the host software application 116 by the user 102, request storage of the recorded events as a script (e.g., script 120) in a script database located at the backend device (e.g., script database 118), and request storage of data (e.g., data 122) associated with the recorded events at the time of recording the respective events.

According to an example embodiment, the automation explorer engine 148 may be configured to retrieve the script of recorded events and the data associated with the recorded events from a script database (e.g., script database 118) located at the backend device 108; and initiate execution of the script to generate test results for the user 102.

According to an example embodiment, the event selection engine 144 may be configured to receive a request to retrieve from a script database located on the backend device (e.g., script database 118) one or more scripts that include events that occur during execution of the host software application 116 and data associated with the events.

According to an example embodiment, the automation center engine 146 may include a script composer engine 150 configured to generate a scenario including a start event and an end event. Generating the scenario may include receiving a request from the user, via an action associated with the script graphical symbol, to select a first script, obtaining the selected first script and associating the selected first script with a first selected script graphical symbol displayed within the graphical display. For example, a "script" graphical symbol may be selected by the user from a graphical display area of "Items," and an already-existing script may be retrieved (e.g., from the script database 118) and associated with the graphical script symbol in a scenario area of the graphical display.

According to an example embodiment, the automation explorer engine 148 may be configured to initiate a test on the generated scenario.

According to an example embodiment, the automation center engine 146 includes a recorder engine 152 configured to record one or more events occurring during execution of the host software application 116 by the user 102 on the client frontend device 106, and receive a request to store the recorded events as a script. According to an example embodiment, the automation explorer engine 148 may be configured to store the recorded events as a script in a database located at the backend device, and store data associated with the recorded events at the time of recording the respective events.

According to an example embodiment, the script composer engine 150 may be configured to associate a role value with the first script. For example, the user may associate a graphical display symbol indicating a role value to the script, and may assign a value to the role (e.g., manager role, employee role, president role). For example, if a role of manager is assigned to a script, then logon and logoff steps may be added to the scenario to ensure that only authorized entities are allowed to participate in activities embodied within execution of a script (e.g., only a manager may authorize or approve certain activities).

According to an example embodiment, the script composer engine 150 may be configured to receive a request from the user 102, via an action associated with the script graphical symbol, to select a second script, obtain the selected second script and associate the selected second script with a second selected script graphical symbol displayed within the graphical display; and receive an input from the user requesting a display of a graphical connector symbol indicating a connection of an output graphical symbol on the first selected script graphical symbol to an input graphical symbol within the graphical display. For example, the user 102 may request a second script from the script database 118, and may place a graphical script symbol associated with the second script to the right of the first script symbol, and may connect the first script symbol to the second script symbol to indicate a path of execution (or interpretation) from the first script to the second script.

According to an example embodiment, the script composer engine 150 may be configured to receive a request from the user 102, via an action associated with a conditional graphical symbol, to select a conditional step for inclusion in the scenario, receive input values from the user indicating actions associated with a plurality of conditions associated with the conditional step, and store the input values in association with the conditional step in a database (e.g., script database 118). For example, a conditional symbol may be selected by the user 102 from an "Items" area of the graphical display, and the user may associate various conditions with branch symbols on the conditional symbol (e.g., for a condition of "cancel" the user may set up a branch to an exit, while for a condition of a manager's "approval," the user may branch to a step of completing a transaction initiated by an employee, etc.).

According to an example embodiment, the script composer engine 150 may be configured to display data graphical symbols associated with displayed script graphical symbols in a data pool display area within the graphical display, and display respective input indicators and output indicators on each data graphical symbol when the user moves a cursor over a graphical symbol included in the displayed scenario that is associated with the respective data graphical symbol. Thus, the user 102 may quickly determine whether each graphical symbol is correctly associated with expected data inputs and outputs (or none of either).

According to an example embodiment, a pool editor engine 154 may be configured to provide the user 102 with access to data pools and role pools, to associate information with the pools, and to edit such information. For example, if a role pool is associated with a particular user (e.g., "manager"), the user may edit the information to other values. Further, the user may add other entities to a pool, or delete entities from the pool. Pools may be associated with scripts by the user 102.

A script player engine 156 may be configured to play scripts for testing by the user 102. The scripts may be created, for example, in eXtensible Markup Language (XML), and may be played by traversal of automation peers 132.

A program player engine 158 may be configured to play a program during execution of a script, for example, based on an interpretation of a UI by the interpreter 138

During execution of a script or scenario, an error log may be generated and sent from the automation explorer engine 148 to an automation services manager 160 for storage in an error logs database 162 located on the backend device 108. The automation explorer engine 148 may also send the generated scripts, data, and roles discussed above to the automation services manager 160 for storage in the script database 118. The automation services manager 160 may also receive requests for retrieval of error logs, scripts, data, or roles, and may retrieve them respectively from the error logs database 162 or the script database 118, for transfer to the automation explorer engine 148 for processing on the client frontend device 106.

Figure 2:
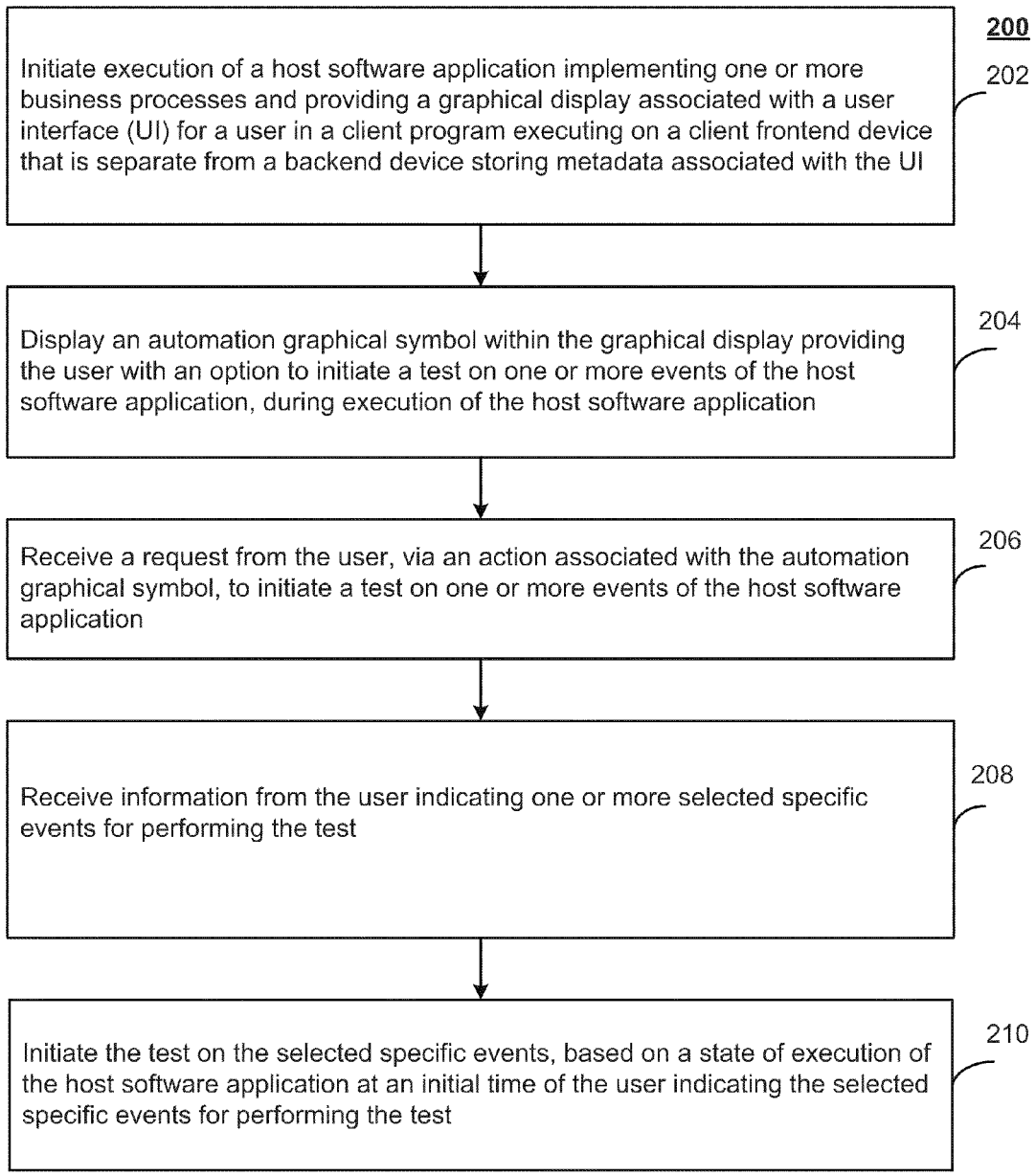
FIG. 2 is a flowchart illustrating example operations of the system of FIG. 1.

FIG. 2 is a flowchart 200 illustrating example operations of the system of FIG. 1. In the example of FIG. 2, execution of a host software application may be initiated, the application implementing one or more business processes and providing a graphical display associated with a user interface (UI) for a user in a client program executing on a client frontend device that is separate from a backend device storing metadata associated with the UI (202).

For example, the user interface manager 136 of FIG. 1 may initiate execution of the host software application 116 implementing one or more business processes and providing a graphical display associated with a UI for the user 102 in the client program 126 executing on the client frontend device 106 that is separate from the backend device 108 storing metadata associated with the UI (e.g., in the metadata repository 114).

An automation graphical symbol may be displayed within the graphical display providing the user with an option to initiate a test on one or more events of the host software application, during execution of the host software application (204).

For example, the automation trigger display engine 140 of FIG. 1 may display an automation graphical symbol within the graphical display providing the user 102 with an option to initiate a test on one or more events of the host software application 116, during execution of the host software application 116, as discussed previously. For example, a button labeled "Automation" may be displayed within the graphical display of UI operations to provide the user 102 with a clickable icon for requesting a test on one or more processes included in a UI. The user 102 may desire the test to ensure that certain activities are valid according to the design of the UI, or the user 102 may wish to view progress of execution of steps within the process (e.g., inputs and outputs) to ensure that execution is correct and efficient, as discussed previously.

A request may be received from the user, via an action associated with the automation graphical symbol, to initiate a test on one or more events of the host software application (206). For example, the automation controller input engine 142 may receive a request from the user 102, via an action associated with the automation graphical symbol, to initiate a test on one or more events of the host software application 116. For example, the user 102 may click on an "Automation" button to request the test, as discussed previously.

Information may be received from the user indicating one or more selected specific events for performing the test (208). For example, the event selection engine 144 of FIG. 1 may receive information from the user 102 indicating one or more selected specific events for performing the test, as discussed previously.

The test on the selected specific events may be initiated, based on a state of execution of the host software application at an initial time of the user indicating the selected specific events for performing the test (210).

For example, the automation explorer engine 148 of FIG. 1 may initiate the test on the selected specific events, based on a state of execution of the host software application 116 at an initial time of the user 102 indicating the selected specific events for performing the test, as discussed previously. For example, the user 102 may wish to test a process associated with a UI for an employee entering data in a sales order. For example, the user may wish to execute the UI and simultaneously record a script for testing, or may wish to assemble a string of scripts as a scenario for testing, or the user may wish to code a script line-by-line for batch testing. As another example, the user may wish to retrieve a script or scenario that was previously saved in the backend device 108 (or the frontend device 106) and run a test on the script or scenario, possibly making edits to the script or scenario to test various aspects of execution.

Figure 3:
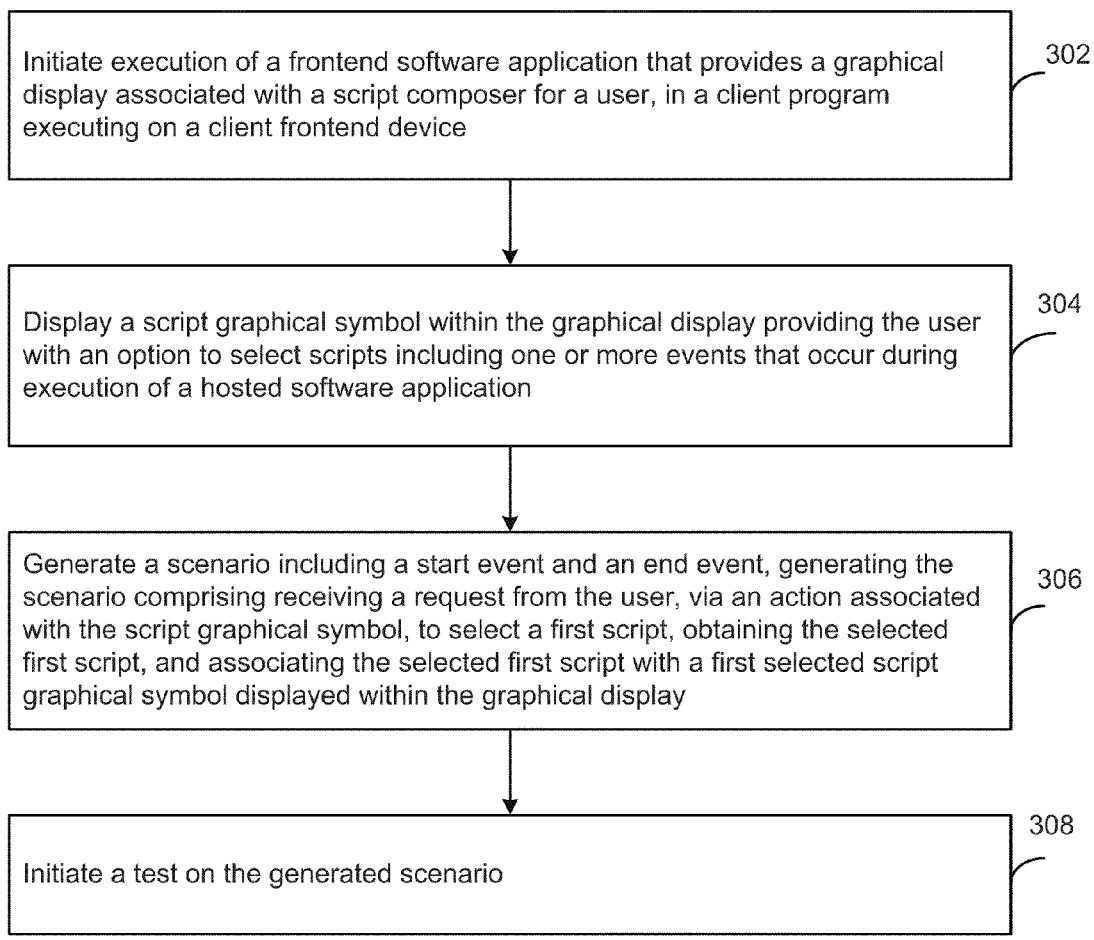
FIG. 3 is a flowchart illustrating example operations of the system of FIG. 1.

FIG. 3 is a flowchart 300 illustrating example operations of the system of FIG. 1. In the example of FIG. 3, execution of a frontend software application may be initiated, the application providing a graphical display associated with a script composer for a user, in a client program executing on a client frontend device (302). For example, the user interface manager 136 of FIG. 1 may initiate execution of the host software application 116 implementing one or more business processes and providing a graphical display associated with a script composer for the user 102 in the client program 126 executing on the client frontend device 106.

A script graphical symbol may be displayed within the graphical display providing the user with an option to select scripts including one or more events that occur during execution of a hosted software application (304).

For example, the automation trigger display engine 140 of FIG. 1 may display an automation graphical symbol within the graphical display providing the user 102 with an option to initiate a test on one or more events of the host software application 116, during execution of the host software application 116, as discussed previously. For example, a button labeled "Automation" may be displayed within the graphical display of UI operations to provide the user 102 with a clickable icon for requesting a test on one or more processes included in a UI. The user 102 may desire the test to ensure that certain activities are valid according to the design of the UI, or the user 102 may wish to view progress of execution of steps within the process (e.g., inputs and outputs) to ensure that execution is correct and efficient, as discussed previously.

A scenario may be generated, the scenario including a start event and an end event. Generating the scenario may include receiving a request from the user, via an action associated with the script graphical symbol, to select a first script, obtaining the selected first script, and associating the selected first script with a first selected script graphical symbol displayed within the graphical display (306).

For example, the script composer engine 150 of FIG. 1 may generate a scenario including a start event and an end event, as discussed previously. For example, a "script" graphical symbol may be selected by the user from a graphical display area of "Items," and an already-existing script may be retrieved (e.g., from the script database 118) and associated with the graphical script symbol in a scenario area of the graphical display.

A test may be initiated on the generated scenario (308). For example, the automation explorer engine 148 of FIG. 1 may initiate a test on the generated scenario, as discussed previously. The user 102 may desire the test to ensure that certain activities are valid according to the design of the UI, or the user 102 may wish to view progress of execution of steps within the process (e.g., inputs and outputs) to ensure that execution is correct and efficient, as discussed previously.

Figure 4A:
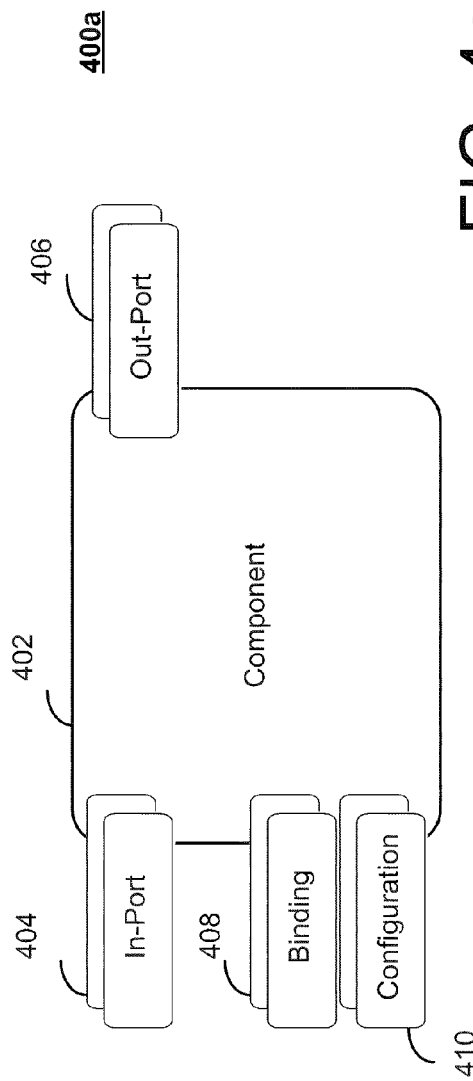
FIGS. 4a-4b are block diagrams illustrating an example component structure for the system of FIG. 1.
Figure 4B:
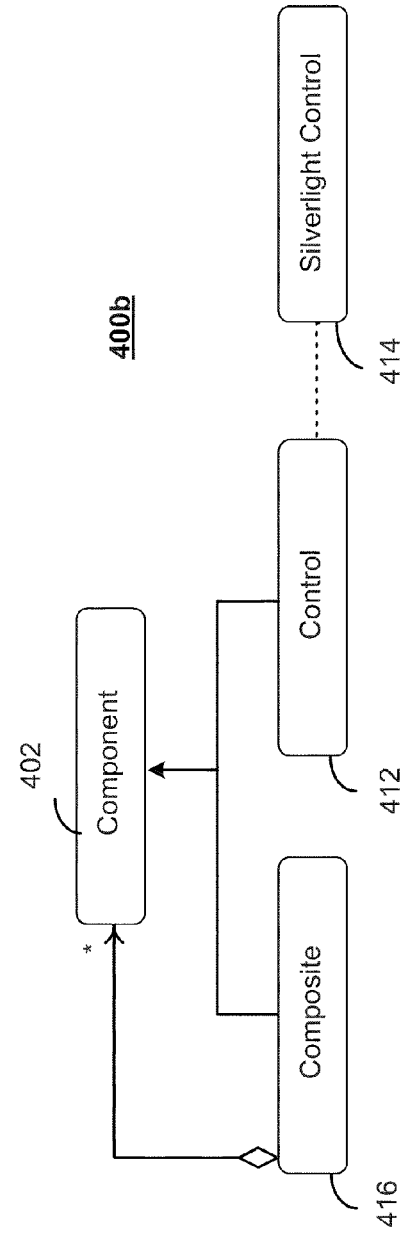

FIGS. 4a-4b are block diagrams illustrating an example component structure for the system of FIG. 1.

According to an example embodiment, a UI component 402 may include a self contained model of a UI that may be declaratively used in another UI model. A declarative interface 400a of a UI component 402 may include in-ports 404 and out-ports 406. These ports may be used to implement a loosely coupled behavior in embedding or navigation scenarios. The data of a loosely coupled component are loaded asynchronous (i.e., an additional roundtrip between the frontend and backend may be needed). The declarative interface 400a may also include binding 408, for tightly coupled behavior in embed scenarios (e.g., synchronous loading)—working directly on the data model of a parent UI model (e.g., via references to the parent data model). The declarative interface 400a may also include configuration 410. A technical configuration may be exposed, e.g., to enable a user to support different styles/flavors, e.g., statically set at design time.

In an example implementation, a mode may be implemented in the framework during execution which provides signals to the automation framework when pending operations such as loading of asynchronous components are complete. The automation may not know all facets of embedding, and such signals may thus aid in avoiding errors that may otherwise be caused by initiating automation of elements that may not yet be present.

As shown in a logical component model 400b of FIG. 4b, a component 402 may be a control 412 provided by a system framework or implemented in association with framework controls (e.g., a Silverlight control 414). A component 402 may be a composite 416 (e.g., composite control, building block, etc.) which may include other components (e.g., nested composites and/or controls). Components 402 may expose an interface or interfaces for actions, ports and bindings. A composite may be used and configured in a view-composition or used as the target of a navigation as a standalone UI application. The configuration of a non-framework component may be done via the exposed declared interface.

Figure 5:
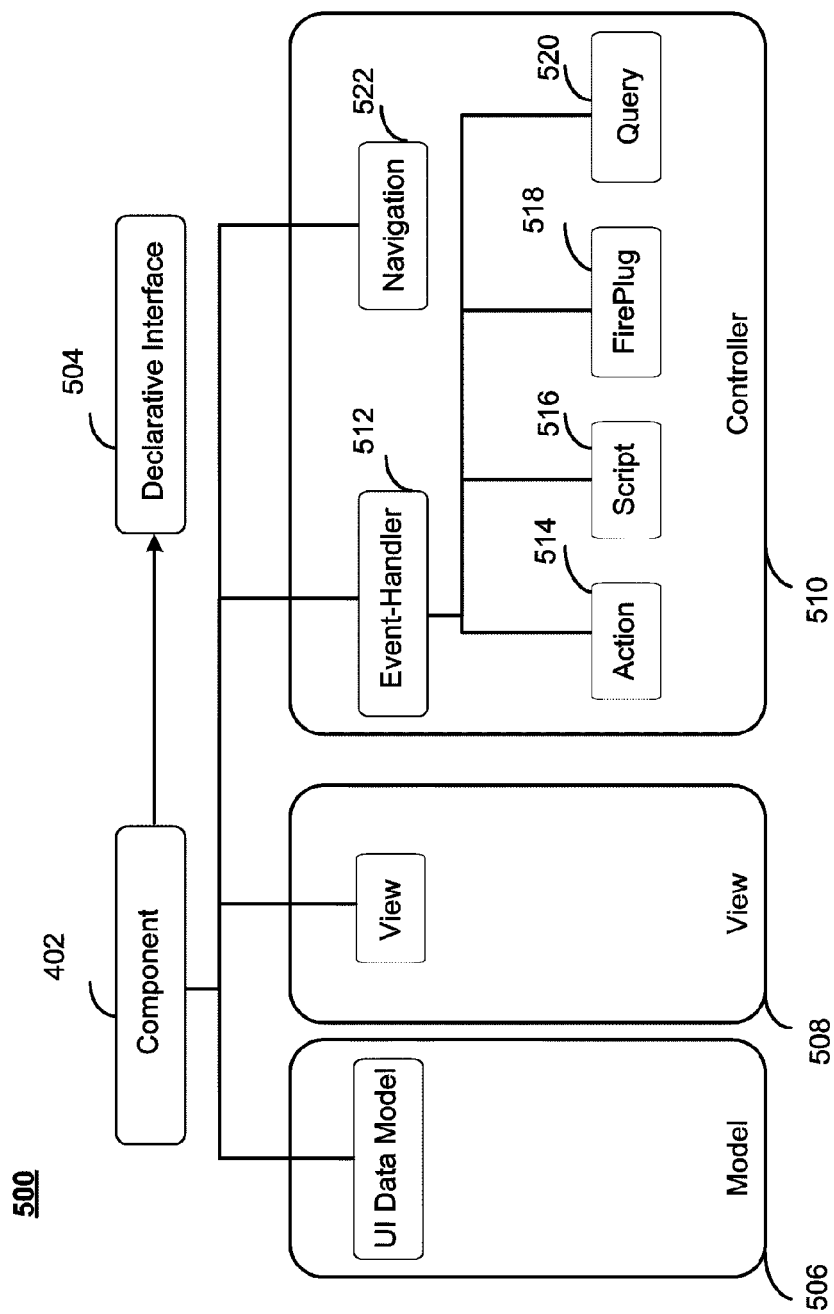
FIG. 5 is a diagram of an example declarative interface structure for components.

FIG. 5 is a diagram of an example declarative interface structure 500 for components. A component 402 may include a declarative interface 504, a model 506, a view 508, and a controller 510. For example, a view 508 may include a description of the user interface which binds to a UI data model 506 and triggers event-handlers 512. The UI data model 506 may describe data structure, which can bind to backend data. The controller 510 may recognize various types of event-handlers 512 such as business object actions 514, script 516, plug-operations 518 and queries 520. According to an example embodiment, navigation 522 may include a context-mapping for outplug-inplug-operations. The declarative interface 504 may expose ports, binding-capabilities and configuration to the composition environment.

Figure 6:
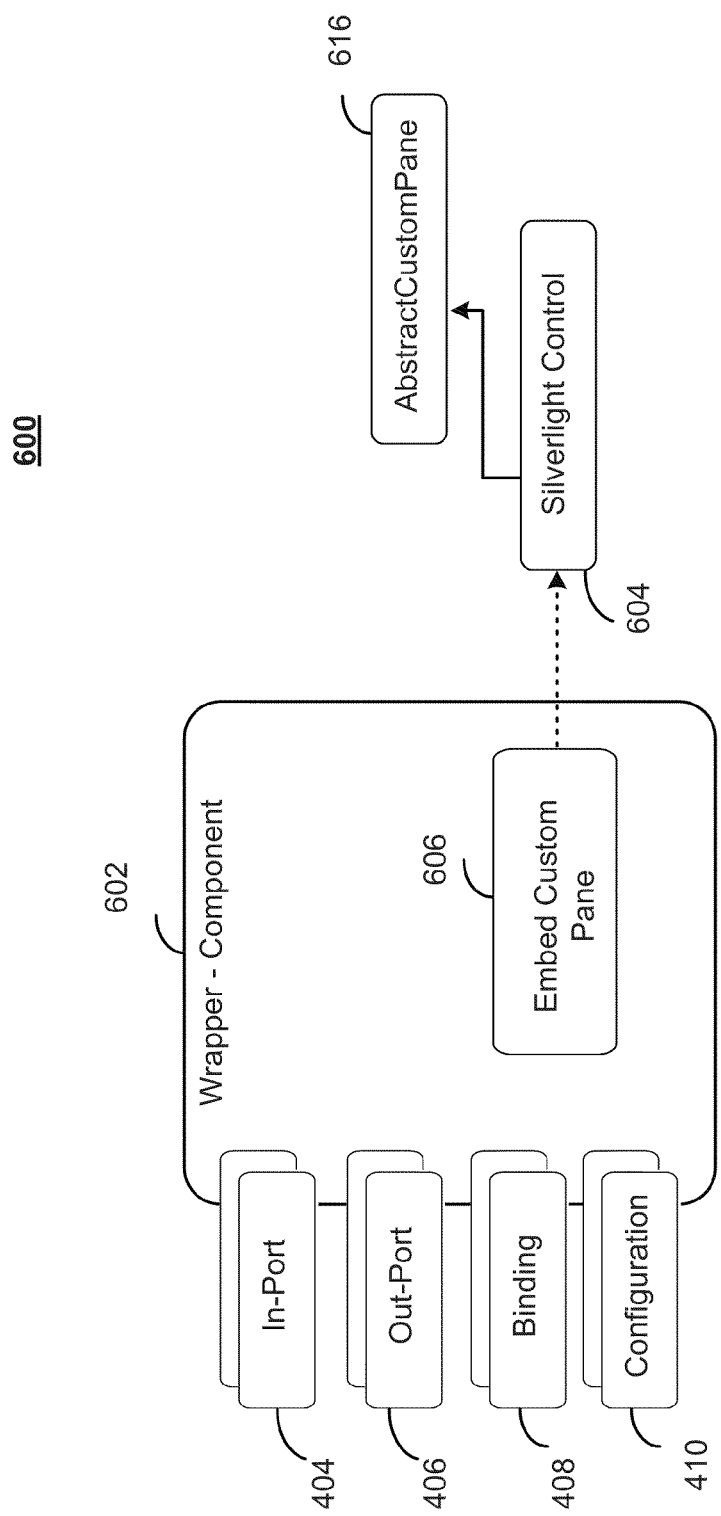
FIG. 6 is a block diagram of an example structure for a component wrapper.

FIG. 6 is a block diagram of an example structure 600 for a component wrapper 602. According to an example embodiment, native Silverlight components may be generated (e.g., Silverlight control 604) which can interact with the component data model and may participate in events. A developer may implement interfaces and use this component via a custom pane 606 in an EmbedComponent-Type. Through this a declared interface wrapper may use this component in other components. Custom panes may be utilized via EmbedComponents and may be associated with a control derived from AbstractCustomPane. In other components Embedcomponents may be used as this gives the designtime a capability to reflect on the declarative interface of the wrapper-component. One skilled in the art of data processing will understand that, in general, interfaces may be implemented in many different technologies, as this type of interface reflection may exist in native UI technologies, and may be leveraged herein on the abstract technology independent UI component definition.

According to an example embodiment, communications between components may be modeled via semantic navigation targets. In this instance, target components are not named directly, but navigation may be invoked based on a host business object and an operation. An operation may be a standard-operation (e.g., display, edit, list, etc.) or a custom operation introduced in a navigation registry. The in- and out-ports of a UI component may be used in the definition of a navigation to identify the involved UI components for the runtime.

A navigation provider may thus replace dynamically at component load/generation time the semantic navigation targets by UI components. This concept allows flexibility regarding determination of navigation targets according to use cases. The semantics of a business object and an operation (e.g., SalesOrder-Open) may be used as a navigation query for requesting a navigation target. Each application UI to be used as a navigation target defines a business object and an operation name as navigation target descriptor to indicate which navigation requests it supports.

To support some special use cases (e.g., globalization, verticalization) a third parameter beside business object and operation may be made available which has no fixed semantic but can be defined by the applications (e.g., in some cases this third parameter is the country for which a special UI component has to be launched).

Figure 7:
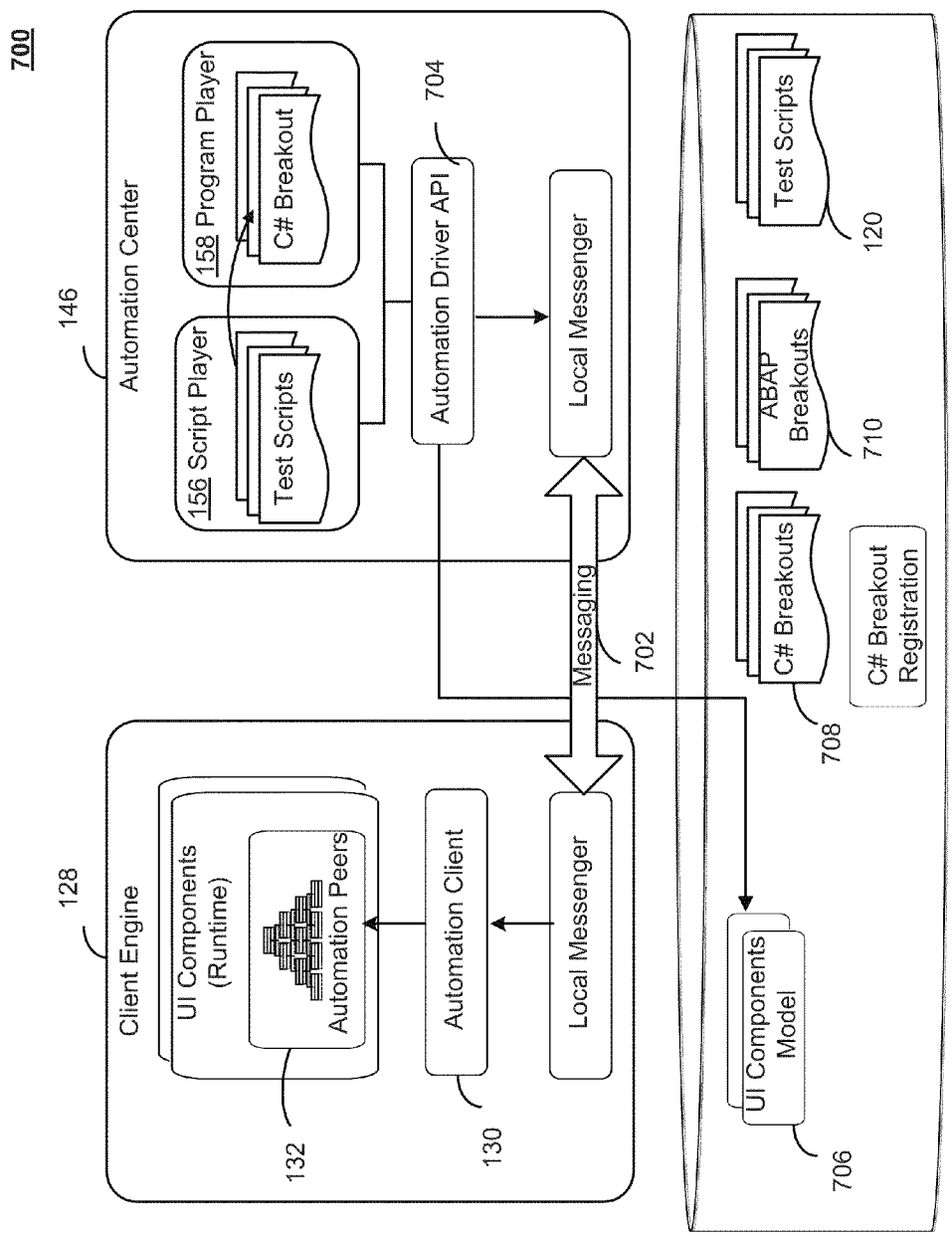
FIG. 7 is a block diagram of an example system for playing scripts within the system of FIG. 1.

FIG. 7 is a block diagram of an example system 700 for playing scripts within the system of FIG. 1. As shown in FIG. 7, local messaging 702 on the client frontend device 106 may be handled by .NET Remoting, COM, or remote message communications. As shown in FIG. 7, the automation center engine 146 of FIG. 1 includes the script player 156 which includes test scripts and the program player 158, which includes C# breakouts. According to an example embodiment, breakouts are exit points in an automation center engine 146 script. An example breakout may be implemented as a small piece of code in the backend device 108 as Breakout classes, which are executed outside the automation center script, to perform complex logical/arithmetic/string operations or reading data from the backend device 108 (as simple logical/arithmetic/string operations are possible in automation center 146 engine functionality). Breakouts may be called at various points in a script. According to an example embodiment, breakouts may include in breakouts, which may be executed on loading the script in the automation center engine 146, pool breakouts, which may be called at a specific point in the script, and out breakouts, which may be executed after the last step in a script is executed. When a breakout is encountered in a script, a request is sent to the backend device 108 via an automation driver Application Programming Interface (API) 704, to a UI components model 706 for handling. At the backend device 108, the C# breakout (which runs on the client frontend device 106) may be run as an Advanced Business Application Programming (ABAP) breakout 710 on the server side.

Figure 8:
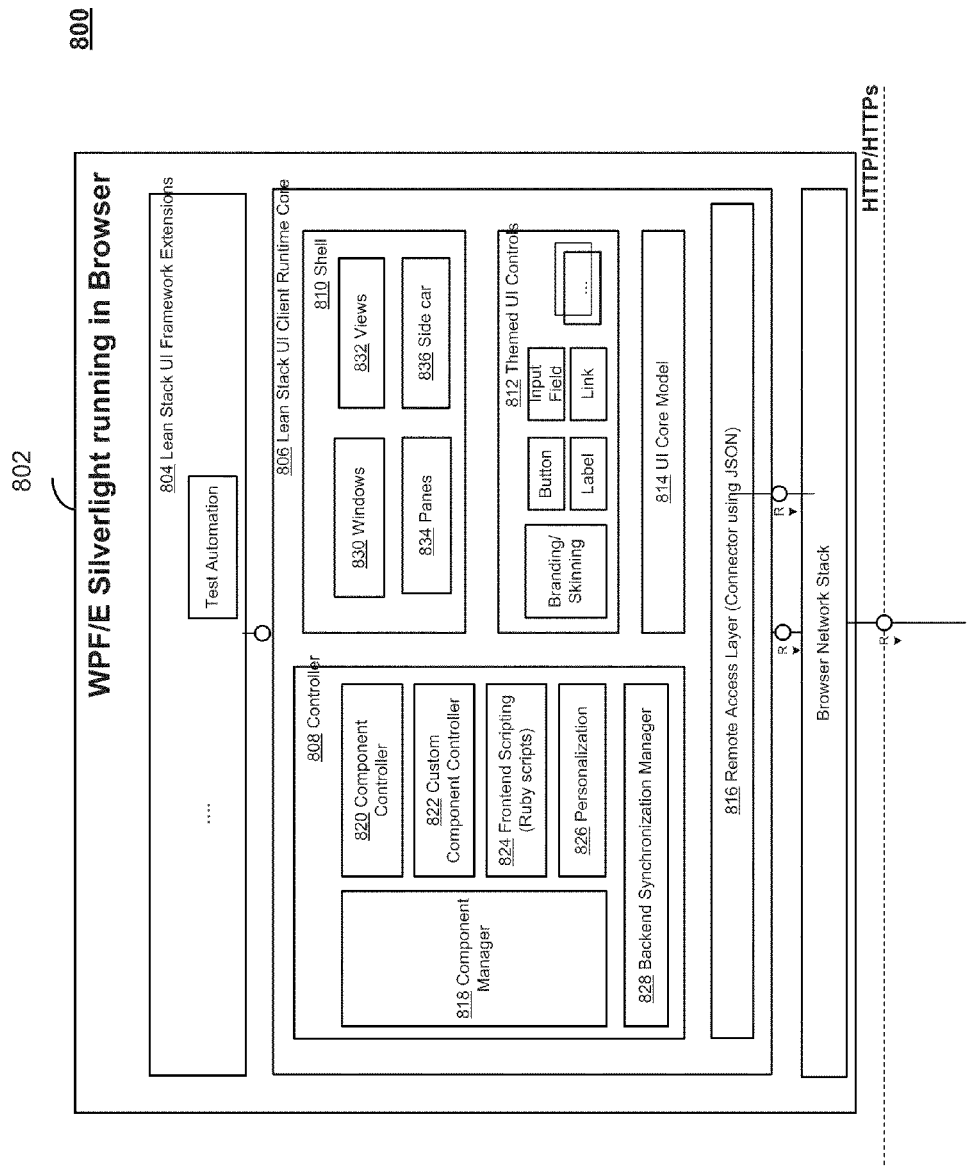
FIG. 8 is a block diagram of an example runtime client for the system of FIG. 1.

FIG. 8 is a block diagram of an example runtime client 800 for the system of FIG. 1. As shown in FIG. 8, Silverlight 802 is running in the client program 126 (e.g., a browser) of FIG. 1. The system includes lean stack UI framework extensions 804, which includes test automation for testing UIs as discussed herein. The system further includes a lean stack UI client runtime core 806, which includes a controller 808, a shell 810, themed UI controls 812, a UI core model 814, and a remote access layer 816. The controller 808 includes a component manager 818 for managing components, which were discussed previously. The controller 808 also includes a component controller 820, a custom component controller 822, a frontend scripting engine 824, a personalization engine 826, and a backend synchronization manager 828. The shell 810 includes windows 830, views 832, panes 834, and side cars 836.

User requests may be triggered on the client side during UI runtime. The first user request may be a navigation request that results in a request to the backend to read a UI component. The UI component is read from a central metadata repository in the backend and transported to the frontend. The component manager 818 may instantiate the UI component and a corresponding component controller 820 for the UI component on the client side and triggers the initialization of the UI component on the backend side. The component manager 818 generates a control tree for the UI component out of the controls provided in a central "Themed Controls" 812 package. These controls ensure uniform look and feel and the ability to change themes consistently. The controls in the "themed UI controls" package may be enabled in a consistent way for test automation and accessibility, and may be provided in a manner such that all native implemented custom UI panes may use the controls. More than one UI component may be needed to render a UI, as UI components may embed other UI components (e.g., a Work Center component may embed a Work Center View Component and they again may embed OWL components, etc.). The top-level UI component that is rendered is a root UI component which renders a common frame for all UI components, e.g., by rendering the top level navigation and has an ability to open a side car for personalization and help.

For each UI component the "generic" component controller 820 for that particular component is instantiated. If a custom UI pane is to be rendered then a corresponding custom component controller 822 is instantiated. The component controller 820 ensures that all controls are bound to the proper fields of the UI model and executes all operations that are configured in the event handlers of the UI component. If, in the event handlers some script segments are discovered, the controller triggers the execution of these scripts in the frontend scripting engine 824. The component controller 820 may also trigger a roundtrip to the backend device 108. In that case the backend synchronization manager 828 identifies all changed data in the UI data model in the client and packs only the changed data in a request to the backend. After the backend controller computes the data in the backend all changed data and only the changed data from the backend (including all data changed via side effects) are transported back to the frontend.

Figure 9:
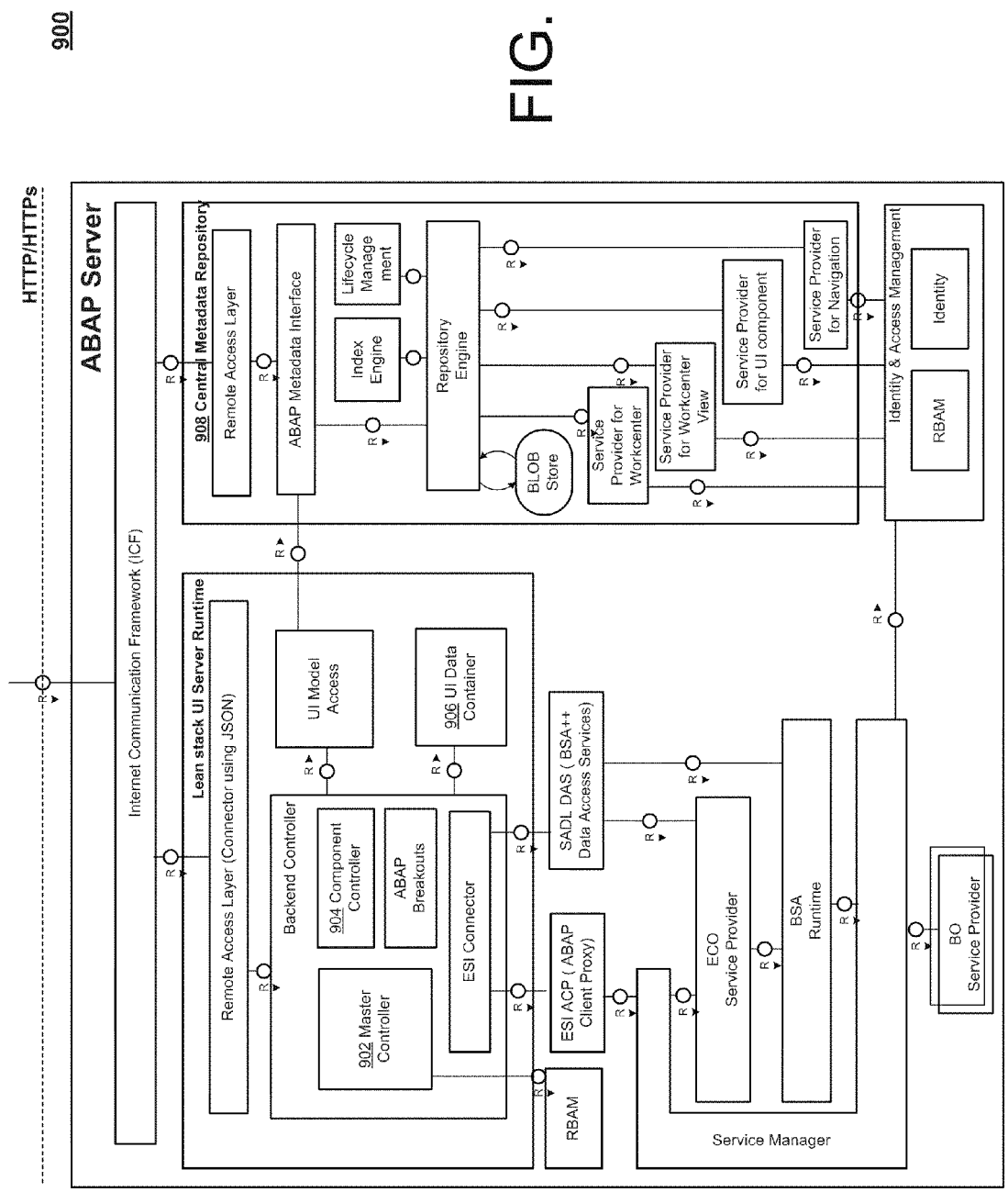
FIG. 9 is a block diagram of an example runtime backend device for the system of FIG. 1.

FIG. 9 is a block diagram of an example runtime backend device 900 for the system of FIG. 1.

After the client runtime 800 (as discussed above) triggers the initialization of a UI component in the backend for a first time in a session, the UI server runtime 900 may first create a master controller 902 for the complete session and then may generate a component controller 904 for each component that is requested from the client runtime 800. Each component controller 904 may build a UI data container 906 from the information of the UI model for a component. The master controller 902 may handle the choreography of the different controllers and may build a bracket for all operations targeted for one controller. The master controller 902 may also trigger another runtime and provide the other runtime with all relevant metadata. Relevant information is stored within the models of the UI components.

After the master controller 902 has processed all component controllers 904, it collects all the data that has changed in the UI data container 906 and transports all changed data to the client.

As discussed previously, the UI components may be stored in a central metadata repository 908 (e.g., similar to metadata repository 114) on the backend device 108.

Figure 10:
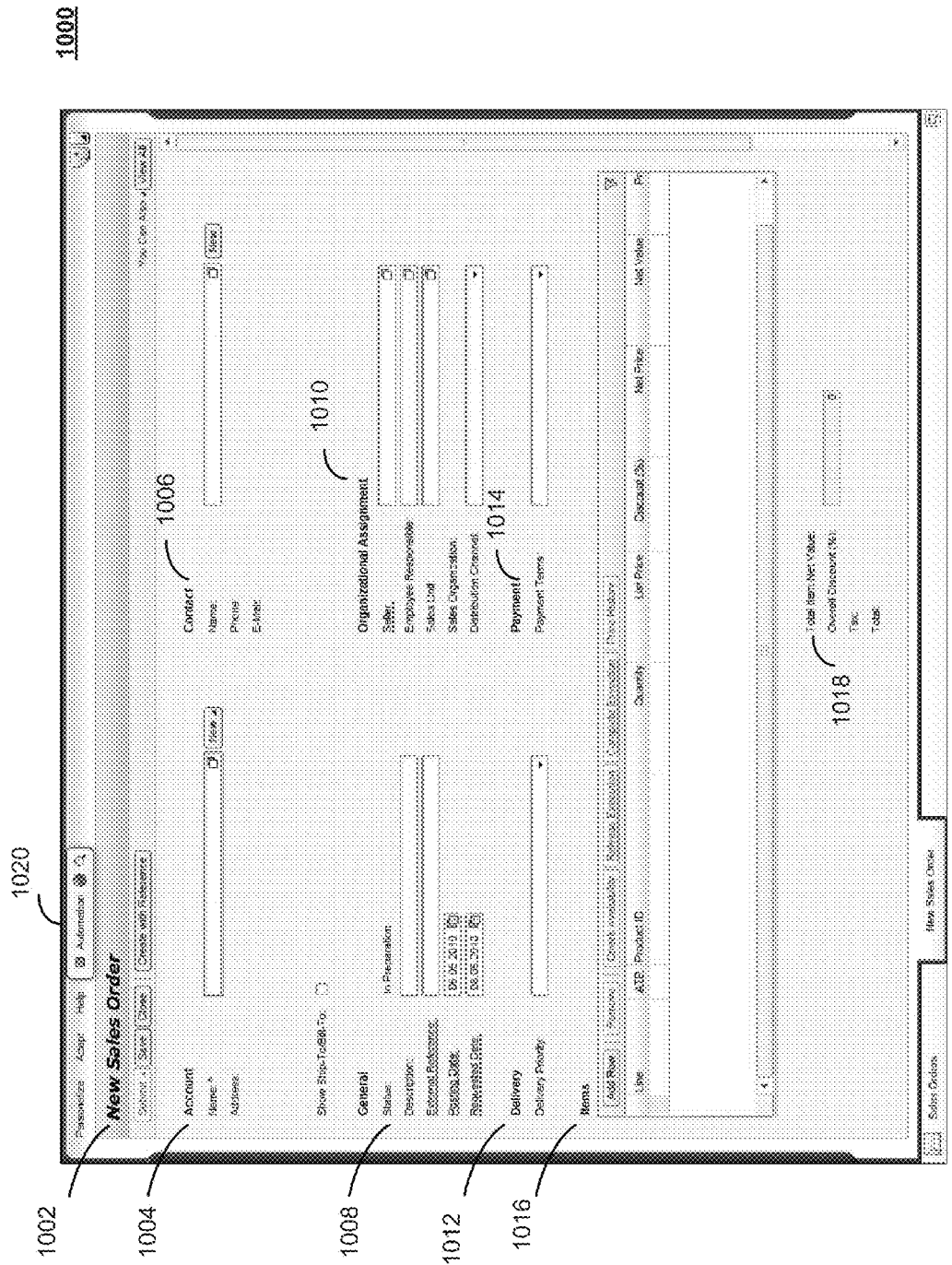
FIG. 10 is a screen shot illustrating an example user interface screen of a sales order.

FIG. 10 is a screen shot illustrating an example user interface screen 1000 of a sales order 1002. As shown in FIG. 10, the sales order screen may be displayed on the display 104 for viewing and use by the user 102, as discussed previously. The sales order screen 1002 includes several fields associated with a sales order, such as account name 1004, contact information 1006, status of the sales order 1008, organizational assignment 1010, delivery priority 1012, payment terms 1014, items to be sold 1016, and total for payment 1018. As shown in FIG. 10, a graphical display symbol 1020 (shown as a button on the top of the display) indicates "Automation," enabling the user 102 to access the automation center engine 146 by clicking on the button, while still executing the application for new sales order 1002. For example, the user 102 may record a script of events that occur while the user is accessing the sales order application, and may store the recorded script, or may play the recorded script for testing purposes.

Figure 11:
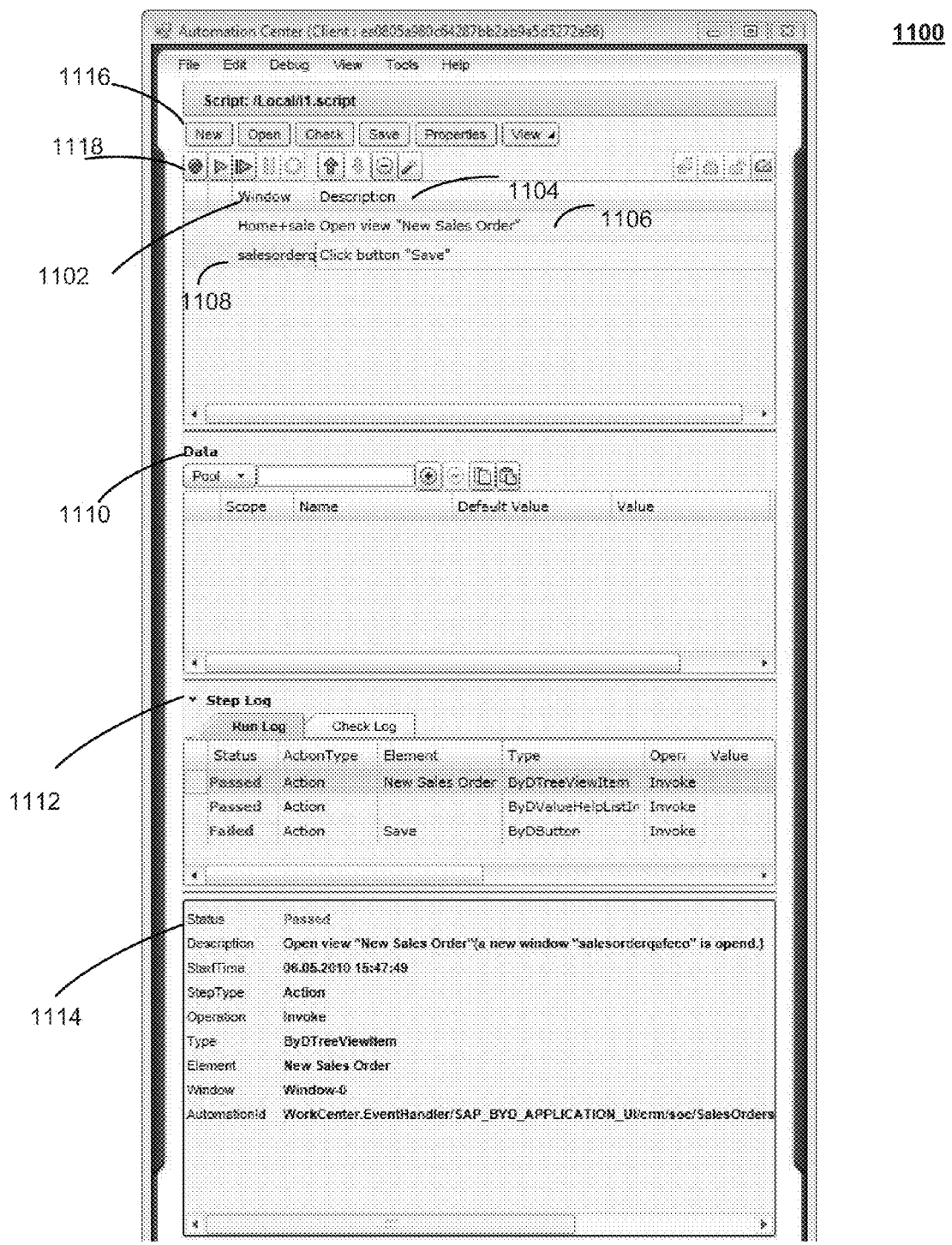
FIG. 11 is a screen shot illustrating an example display view of an automation center displaying an example script.

FIG. 11 is a screen shot illustrating an example display view 1100 of an automation center displaying an example script. As shown in FIG. 11, the example automation center view displays values for a window 1102 and a description 1104. The example script shown in FIG. 11 includes two elements, a first element 1106 for a user opening a new sales order, and a second element 1108 for the user clicking a button the save the sales order. Such elements may indicate steps that the user performed in a host application (e.g., the new sales order application discussed above) while recording via the recorder engine 152 in the automation center engine 146. A data area 1110 is displayed for showing names of data pools, and values associated with the data and data pools. A step log 1112 is displayed showing status values (e.g., passed, failed) of various steps of execution of the script. As shown in the example of FIG. 11, a step of opening the new sales order (status of passed) is selected by the user 102, and an information area 1114 displays detailed information (e.g., status, start time, description, step type, operation, element, ID, etc.) regarding the selected step.

A task bar 1116 at the top of the display shows several options for the user to select in the automation center. For example, the user may select "New" to generate a new script, "Open" to open an existing script, "Check" to check a script, "Save" to save a script, either on the frontend or backend device, "Properties" to view the properties of scripts and script elements, and "View" to view the information as shown for the new sales order script discussed above. A second bar 1118 displays example buttons for selection by the user, including buttons to record a script, play a script, stop the playing of a script, pause the playing of a script, navigation buttons for navigating up or down through the script elements, and editing tools for editing a script.

Figure 12:
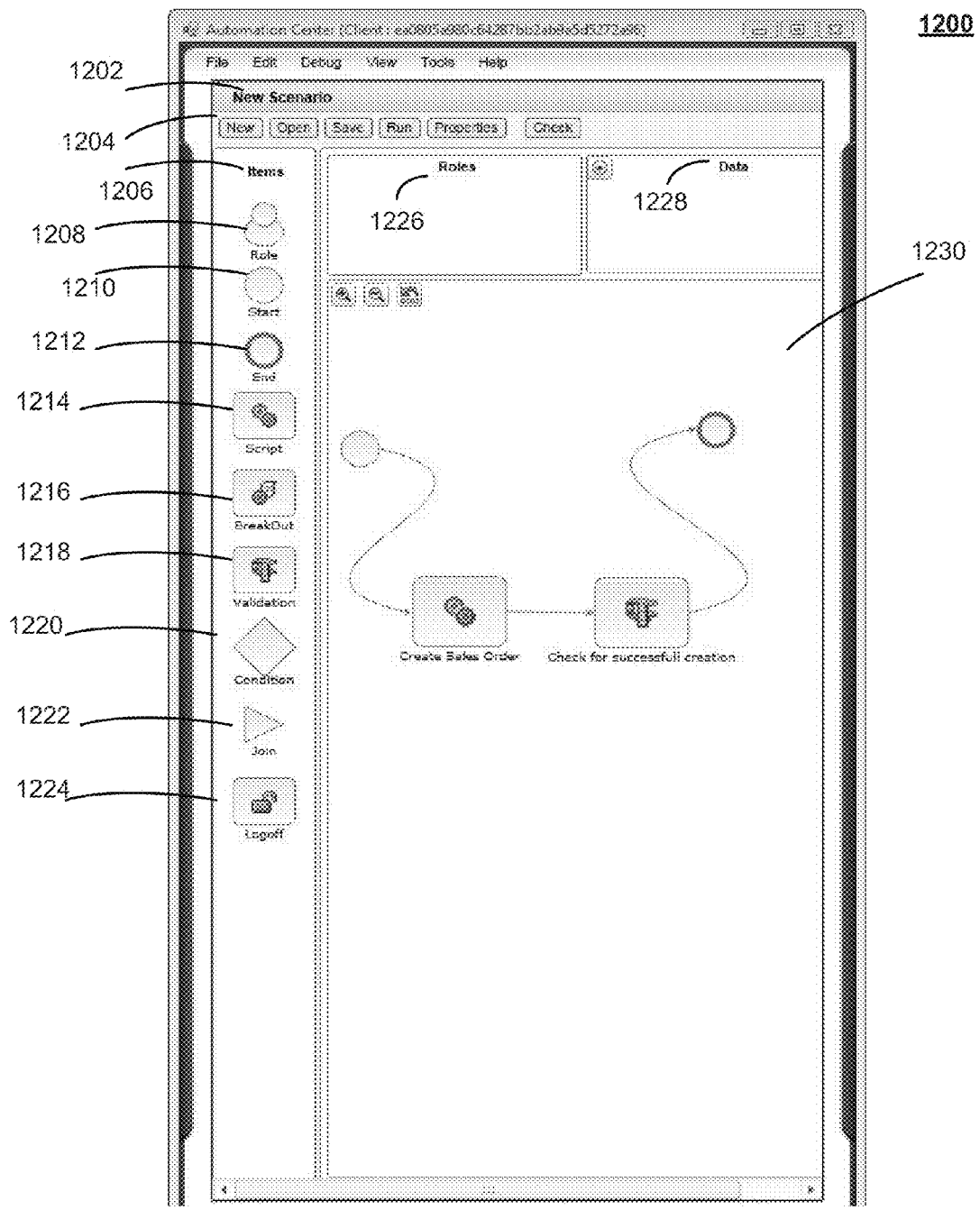
FIG. 12 is a screen shot illustrating an example display view of an automation center displaying an example scenario.

FIG. 12 is a screen shot illustrating an example display view 1200 of an automation center displaying an example scenario 1202. As shown in FIG. 12, the example scenario screen includes a task bar 1204 that includes buttons for the user to select for generating a new scenario, opening an existing scenario, saving a currently displayed scenario, running a currently displayed scenario, displaying properties of a currently displayed scenario, and checking a currently displayed scenario. An "Items" area 1206 includes graphical display symbols for various items that the user may select for generating or editing a scenario. For example, a "Role" symbol 1208 may be used to assign a role to a scenario element such as a script. A "Start" symbol 1210 may be placed at the beginning of a scenario to delimit the element string. Similarly, an "End" symbol 1212 may be placed at the end of a scenario to delimit the element string. A "Script" symbol 1214 may be used by the user to insert a script in the scenario and assign properties to the script. A "Breakout" symbol 1216 may be used by the user to insert a breakout in a script for processing to be performed on the backend device, as discussed previously. A "Validation" symbol 1218 may be used by the user in the scenario to set up a validation element in a scenario. For example, a user may need to validate a particular operation of an employee. A "Condition" symbol 1220 may be used by the user to set up a branch-on-condition element for the scenario. For example, a user may wish to include a two-way or three-way branch from a particular step, based on the state of a condition during execution of the scenario. For example, if a manager validates a particular order, then a branch may be taken to process the order. However, if the manager does not approve an order, then a branch may be taken to discard the order and inform the entity that placed the order of a negative decision.

A "Join" symbol 1222 may be used by the user to indicate a join operation in processing. A "Logoff" symbol 1224 (Logon symbol not shown) may be used by the user to insert a logon element into the scenario so that an entity may be required to login (e.g., verify a correct role entity for using a script to validate an order) in order to participate in events embodied in the respective scenario scripts.

A "Roles" area 1226 may be used for display of roles and role pools associated with a displayed scenario and respective elements of the scenario. A "Data" area 1228 may display data values and variables, and data pools associated with a displayed scenario, and its respective elements. A scenario display area 1230 may display a scenario during creation by a user or for viewing and editing by a user. As shown in FIG. 12, a scenario is displayed that includes a start symbol 1210, a script element "Create Sales Order", a validation element "Check for successful creation", and an end symbol 1212. Thus, the example scenario is created to create a new sales order and validate the successful creation of the sales order.

Figure 13A:
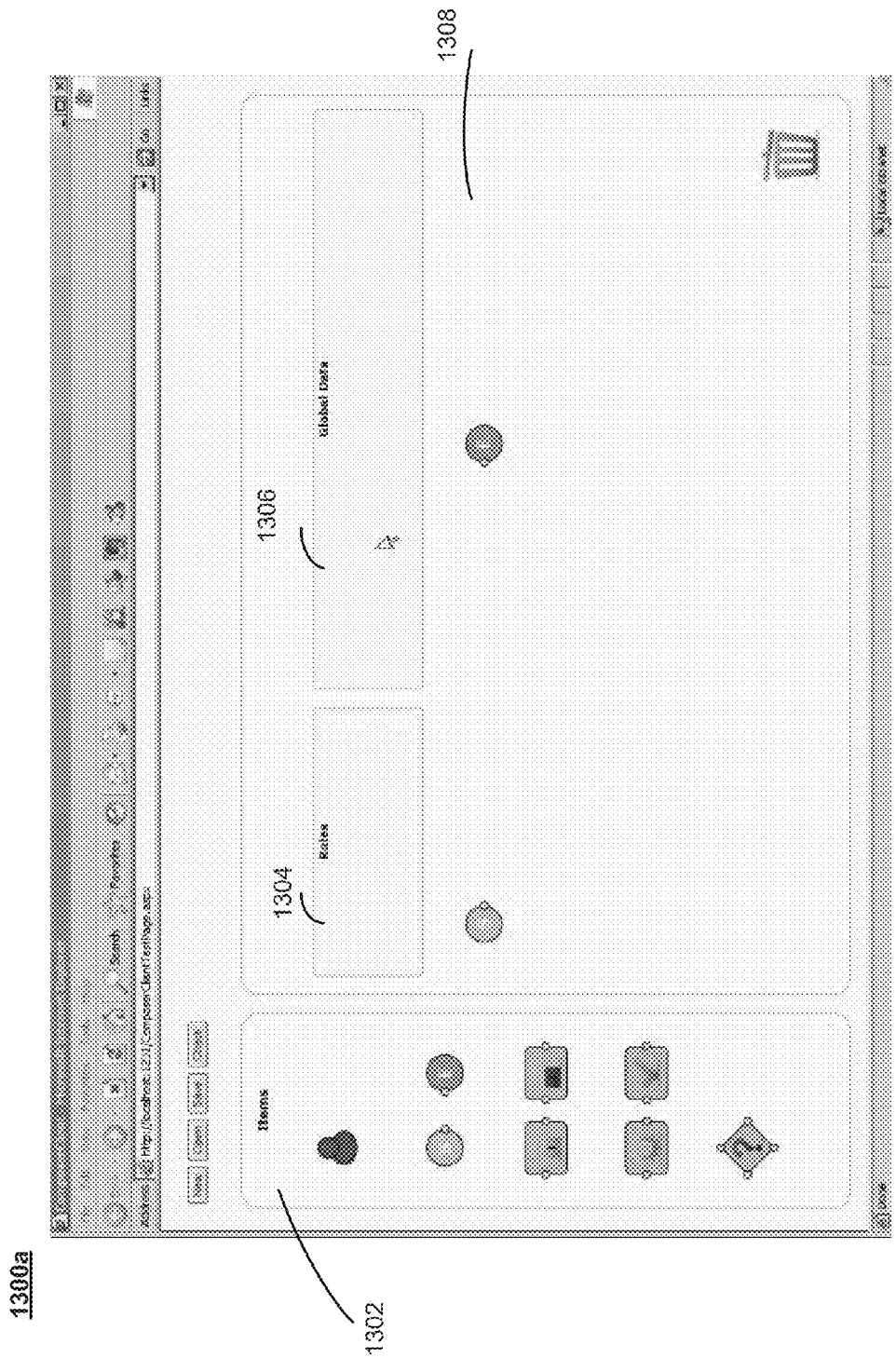
FIGS. 13a-13o are screen shots illustrating an example display view of an automation center displaying an example generation of a new scenario by a user.
Figure 13B:
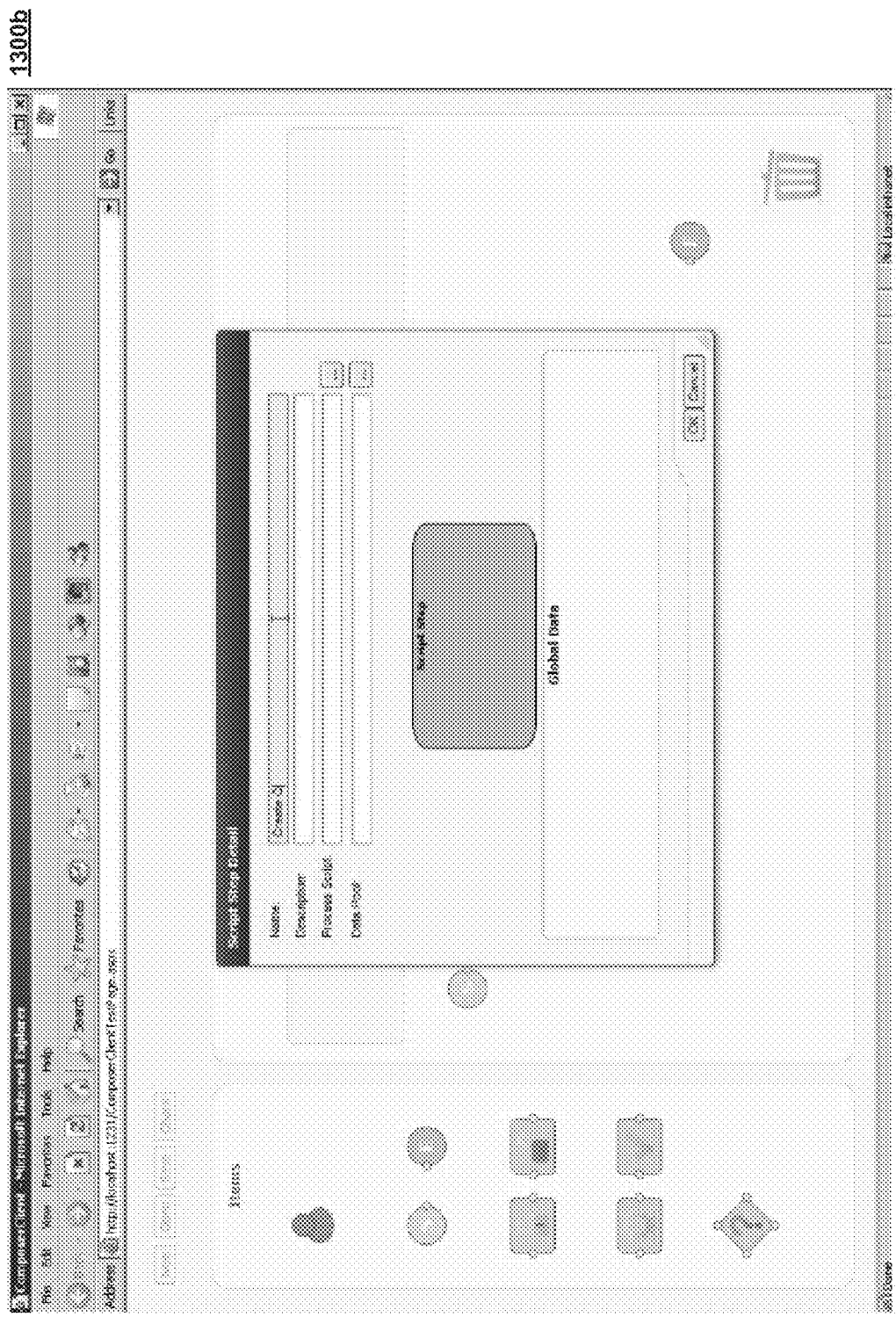
Figure 13C:
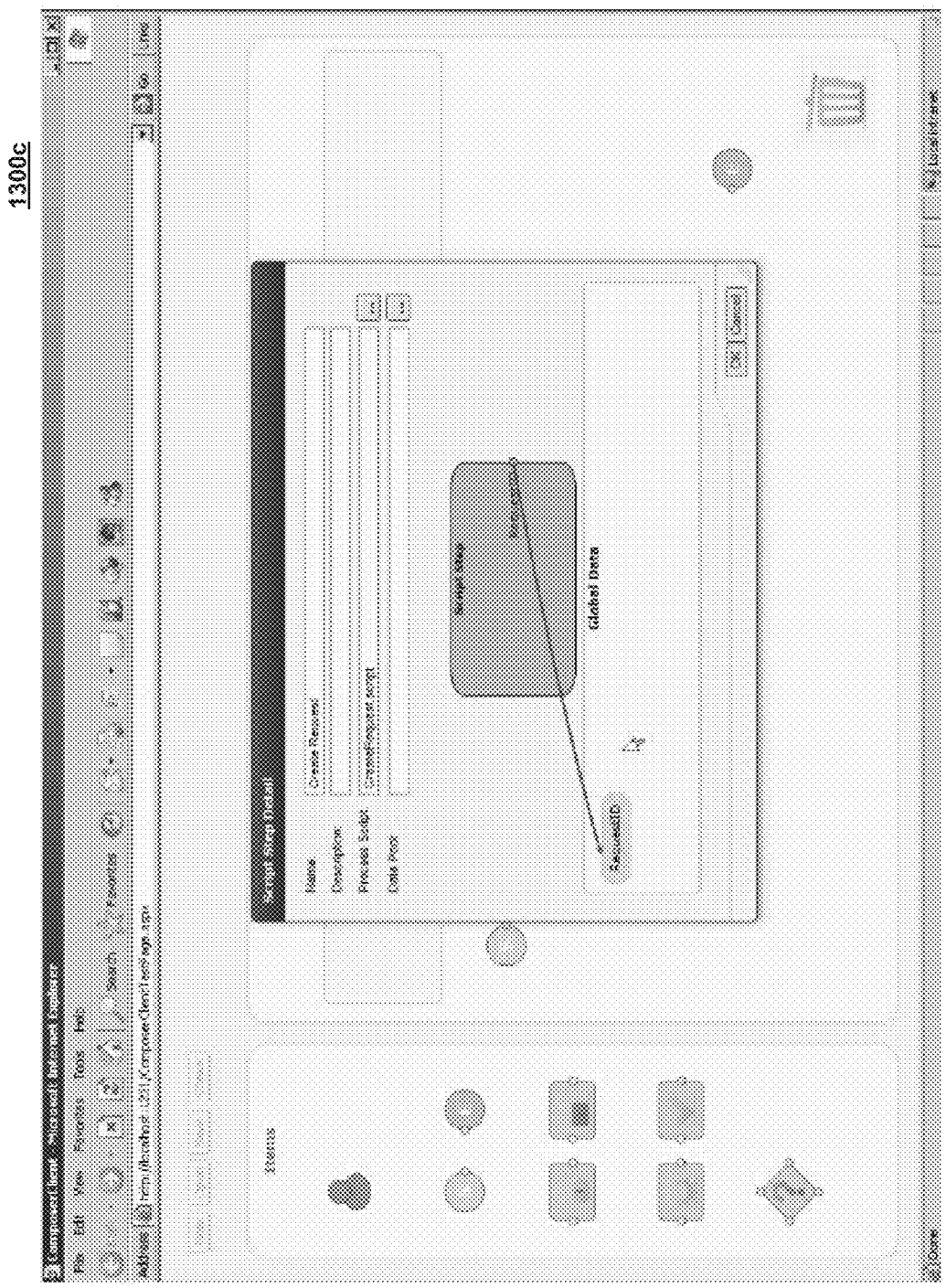
Figure 13D:
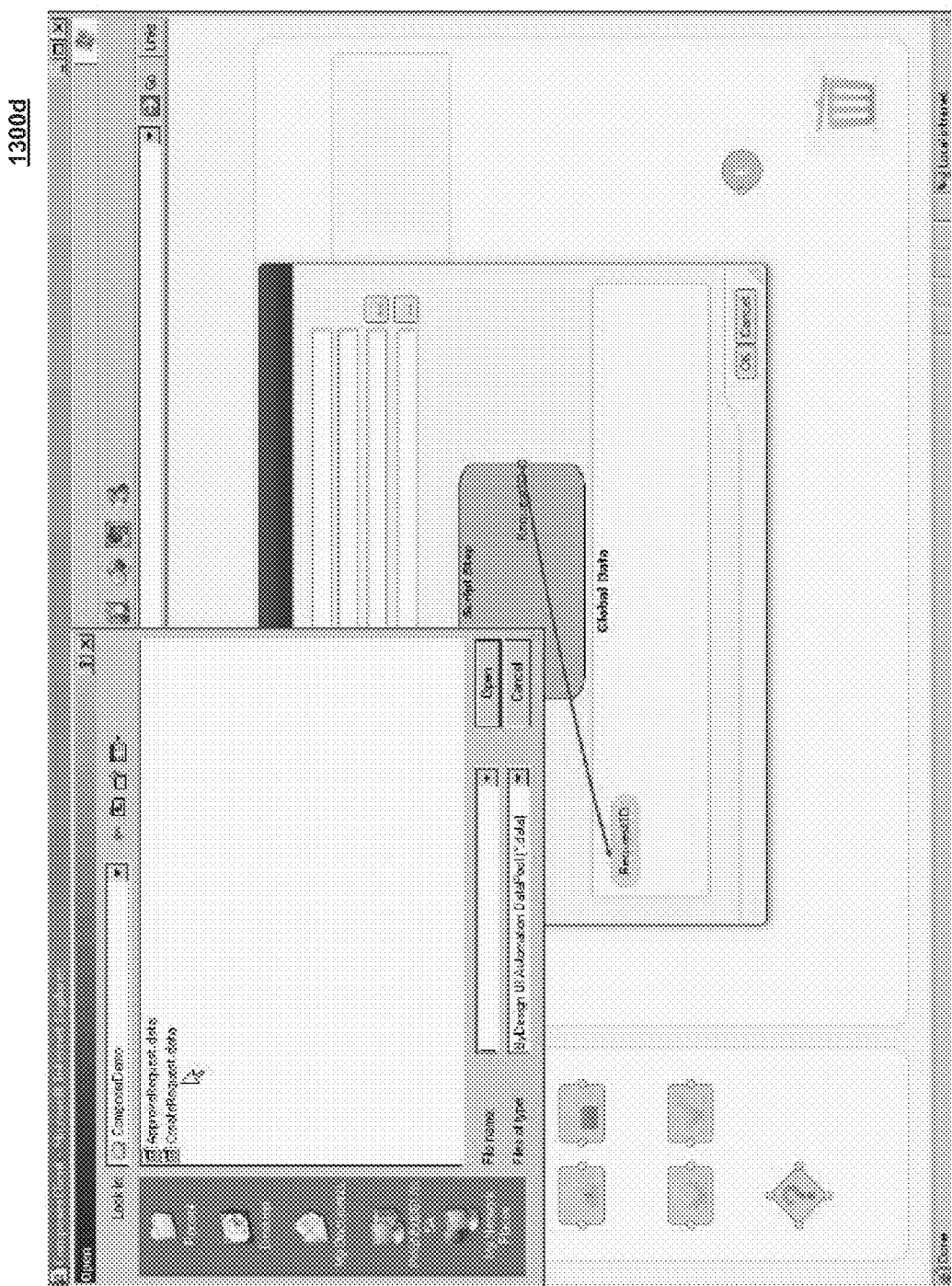
Figure 13E:
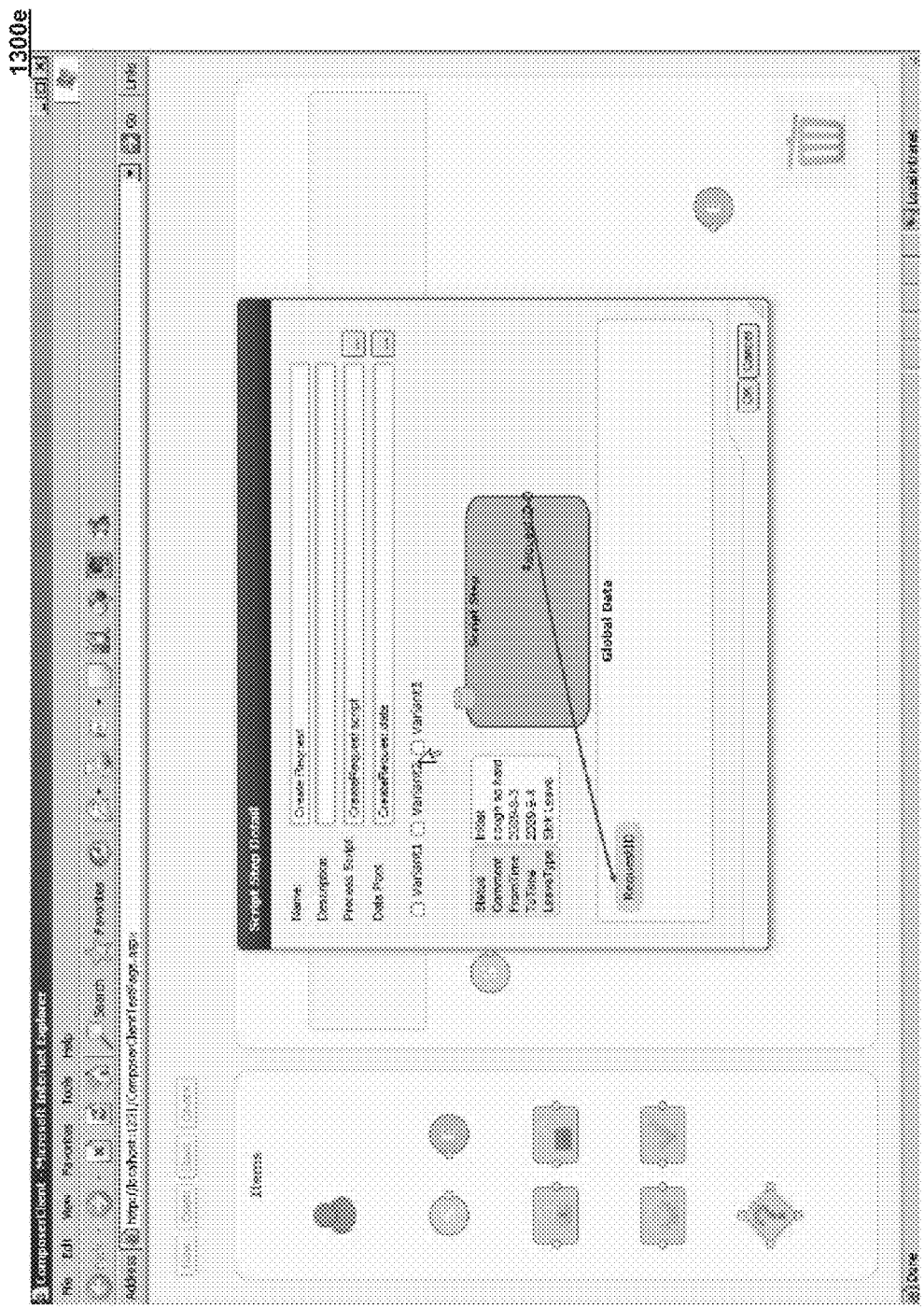
Figure 13F:
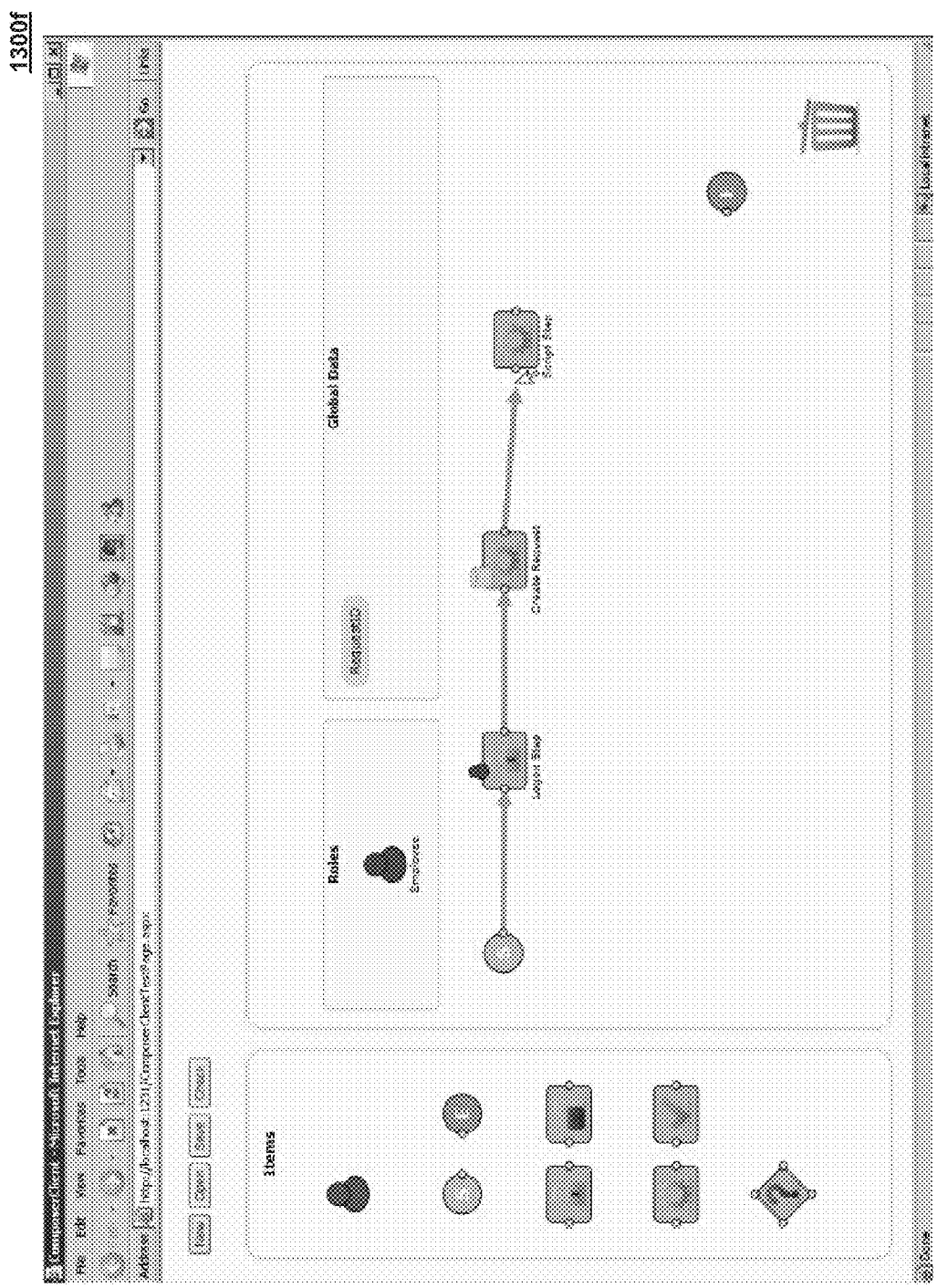
Figure 13G:
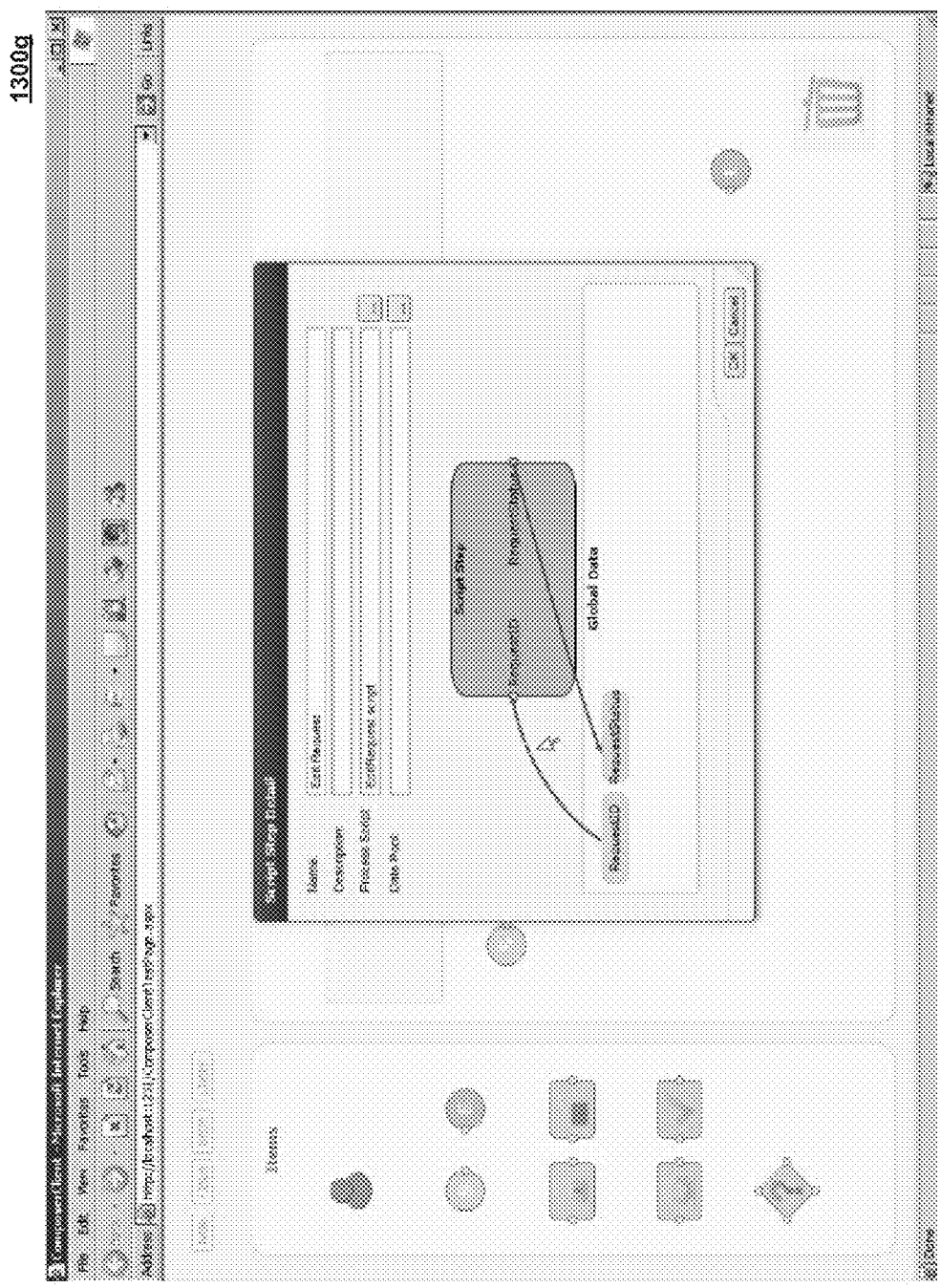
Figure 13H:
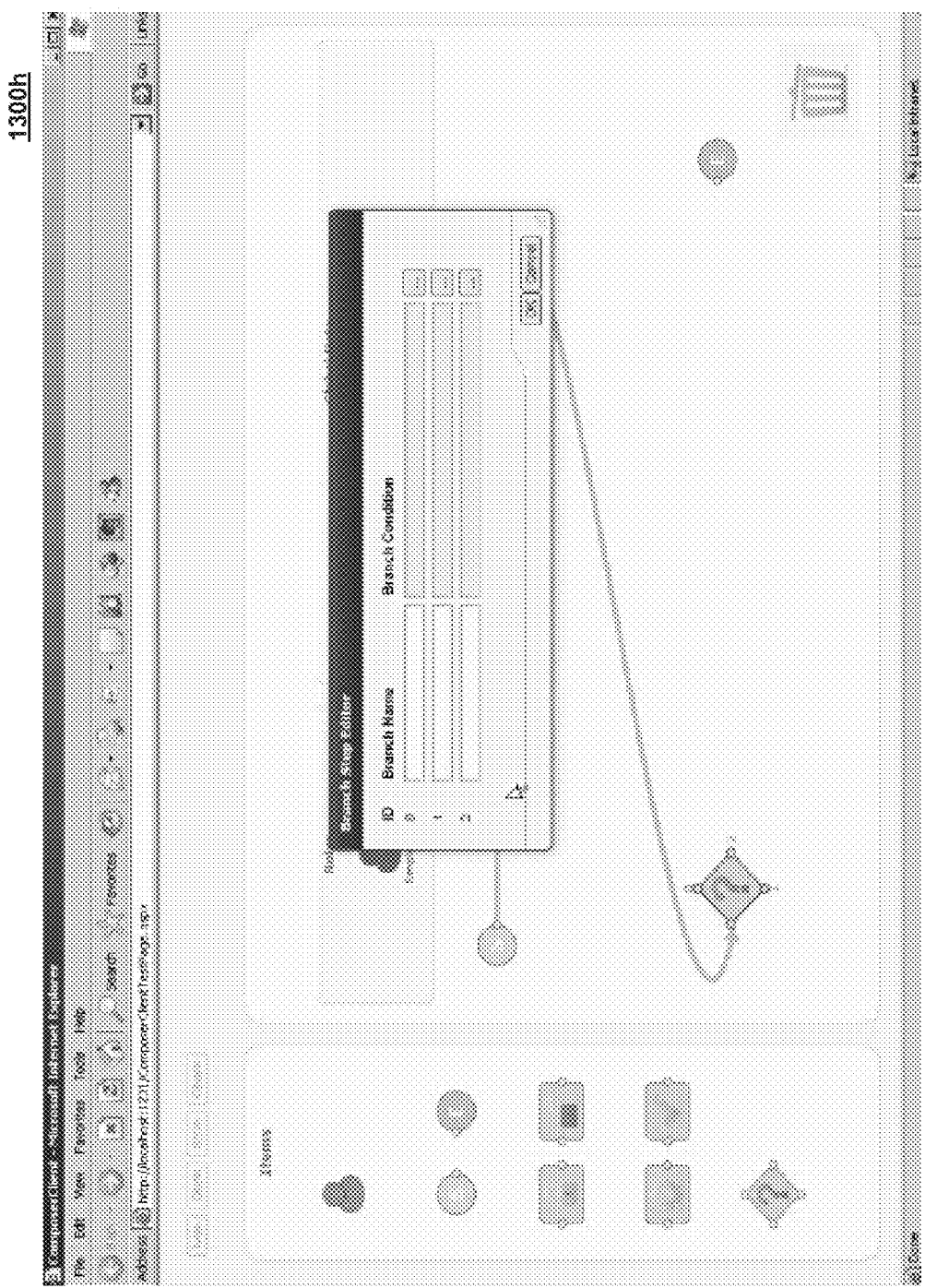
Figure 13I:
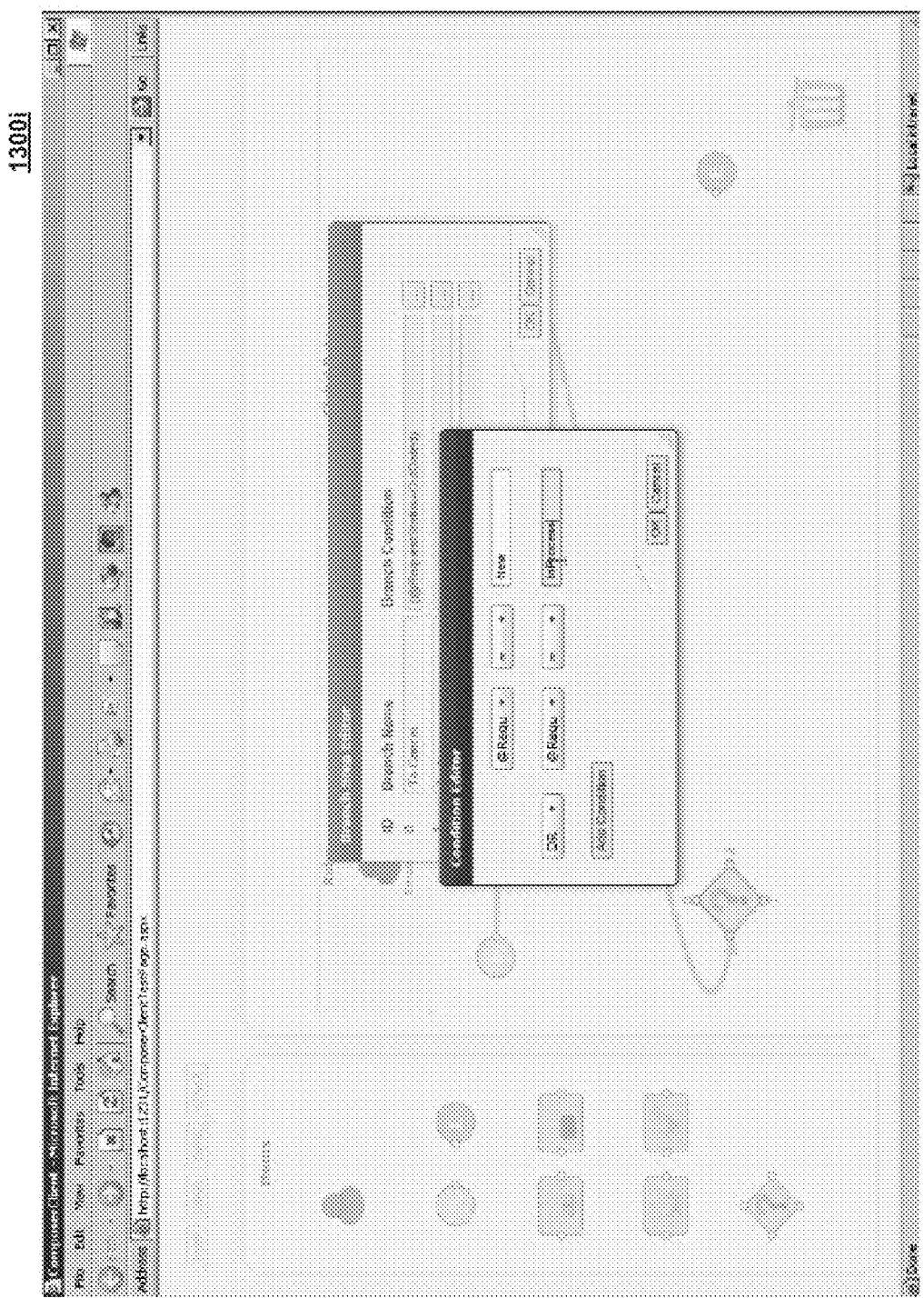
Figure 13J:
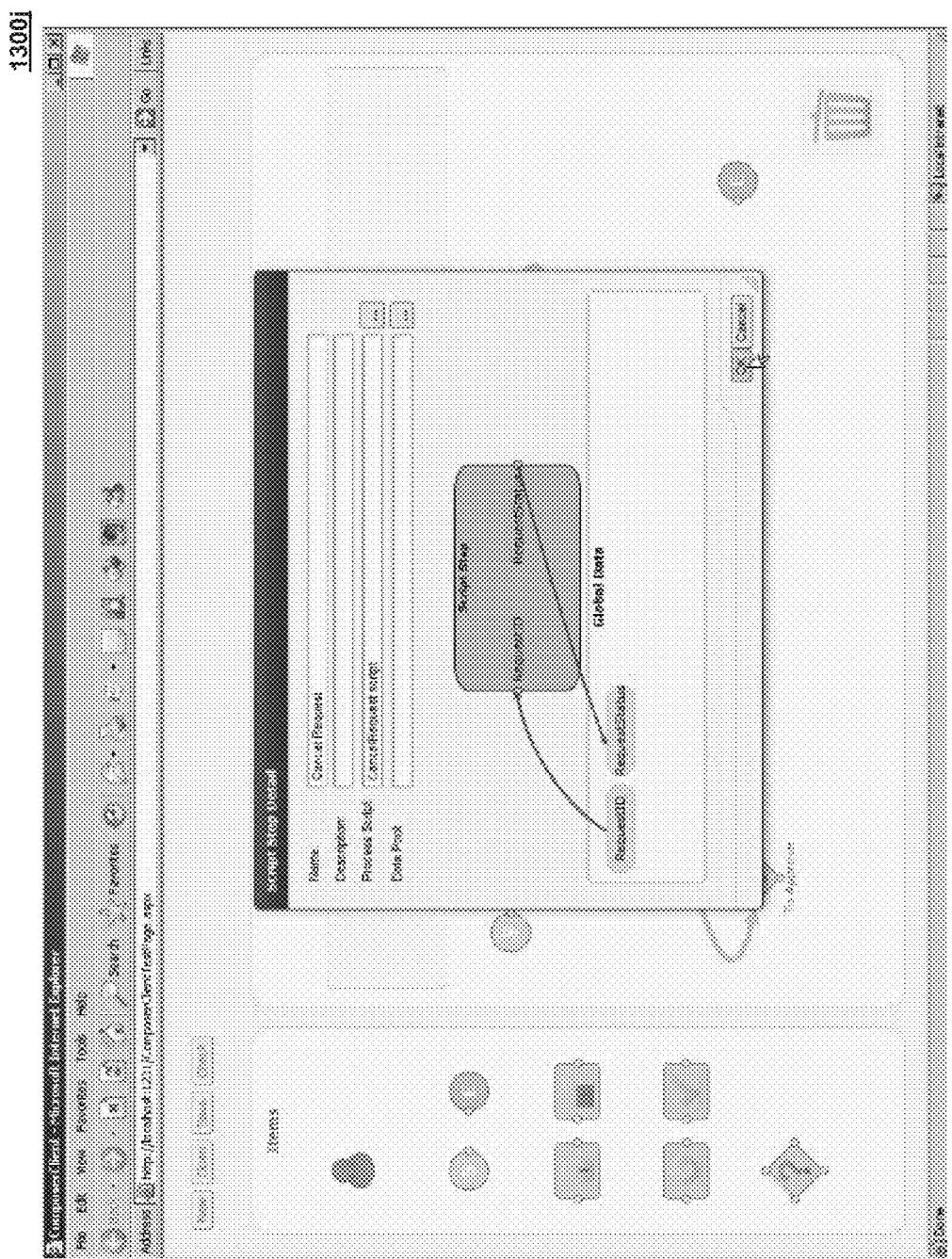
Figure 13K:
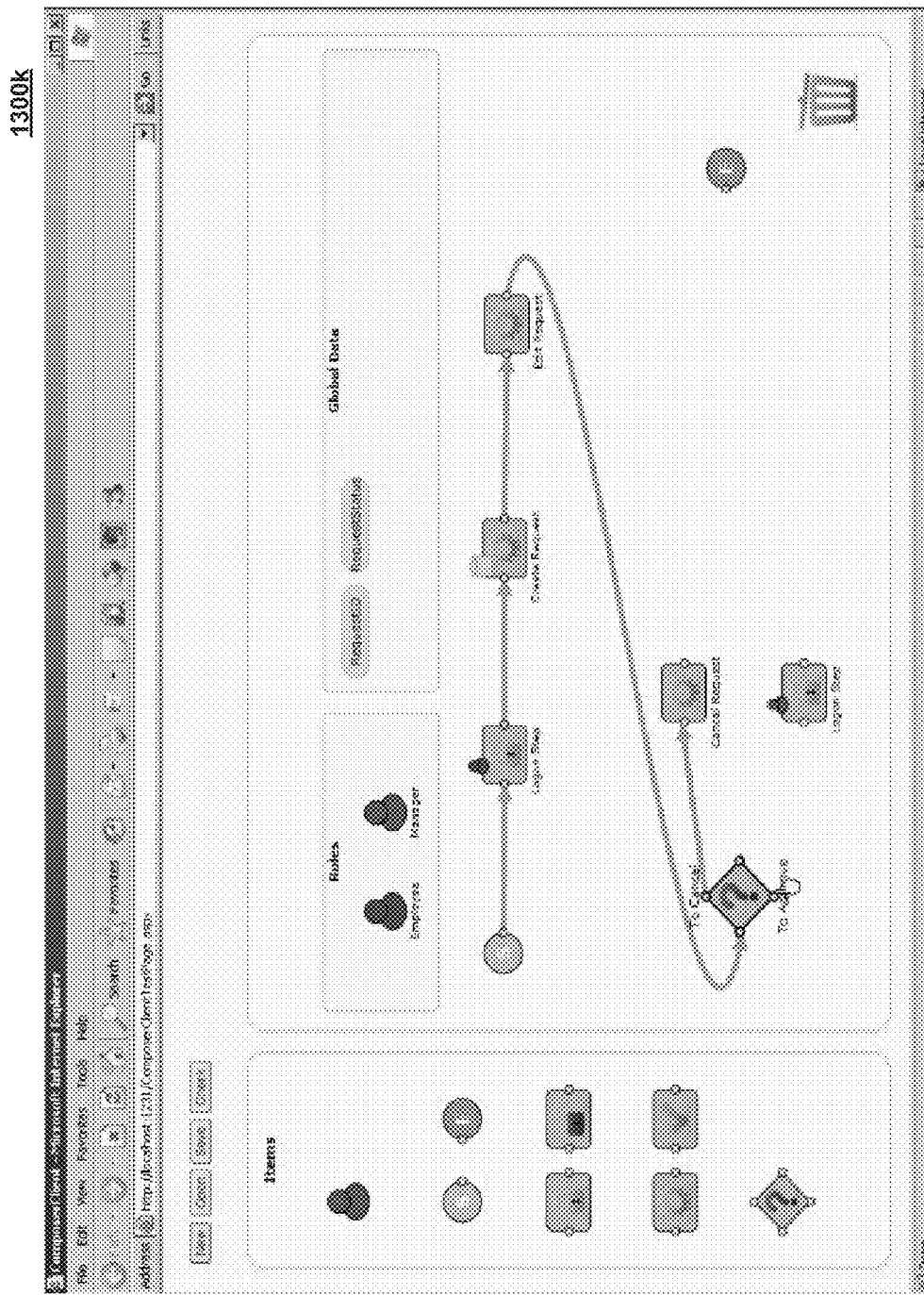
Figure 13I:
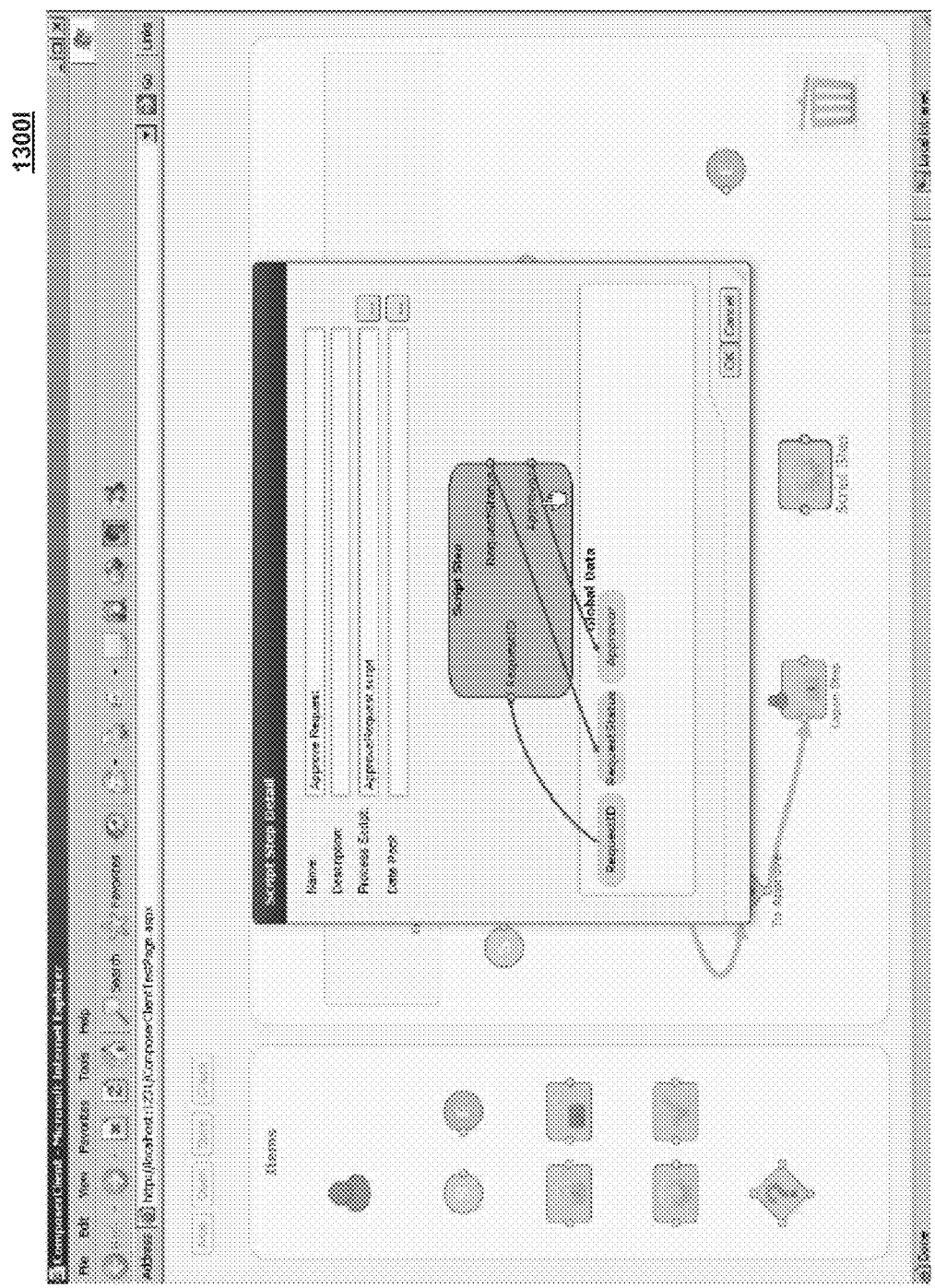
Figure 13M:
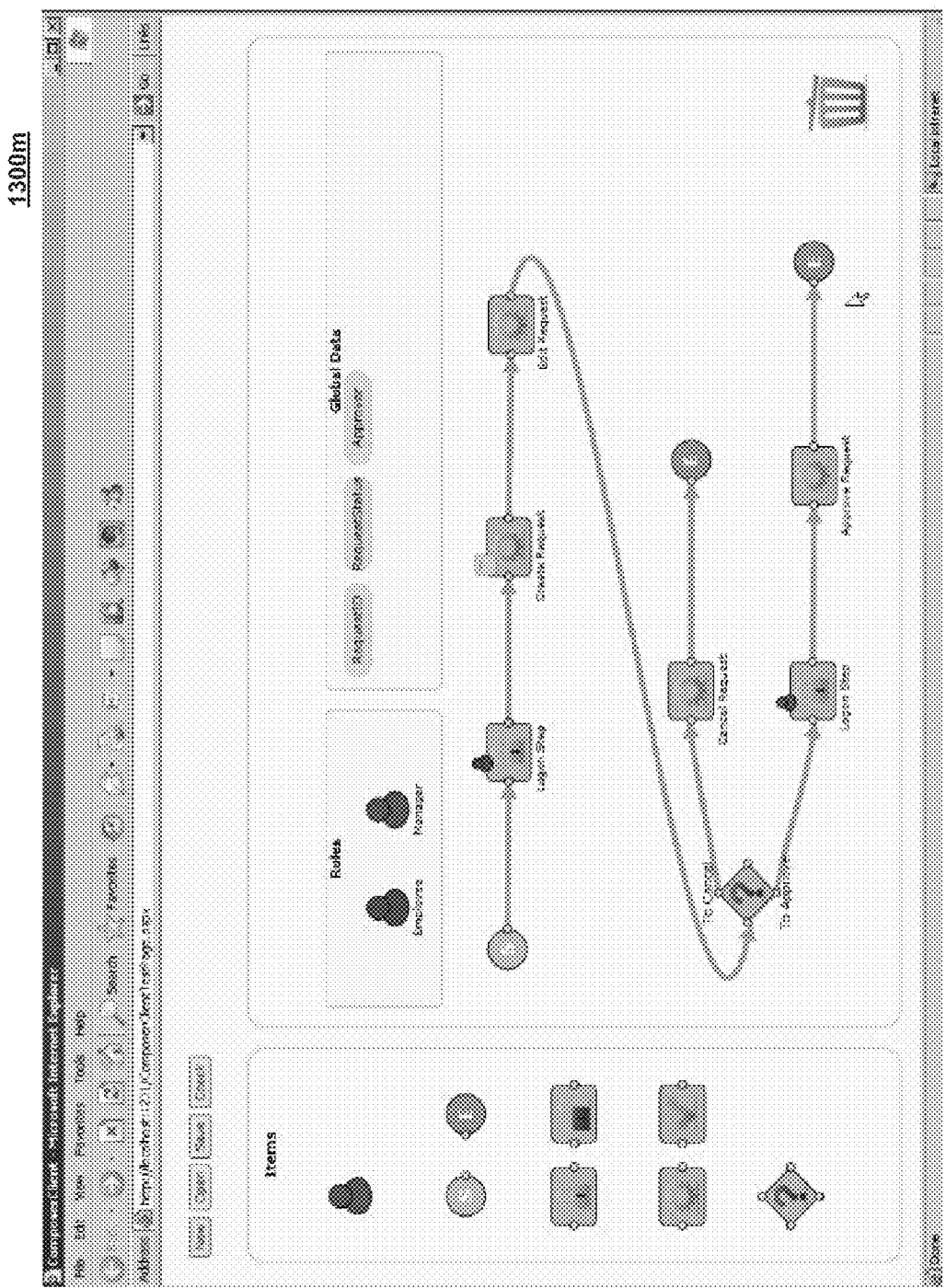
Figure 13N:
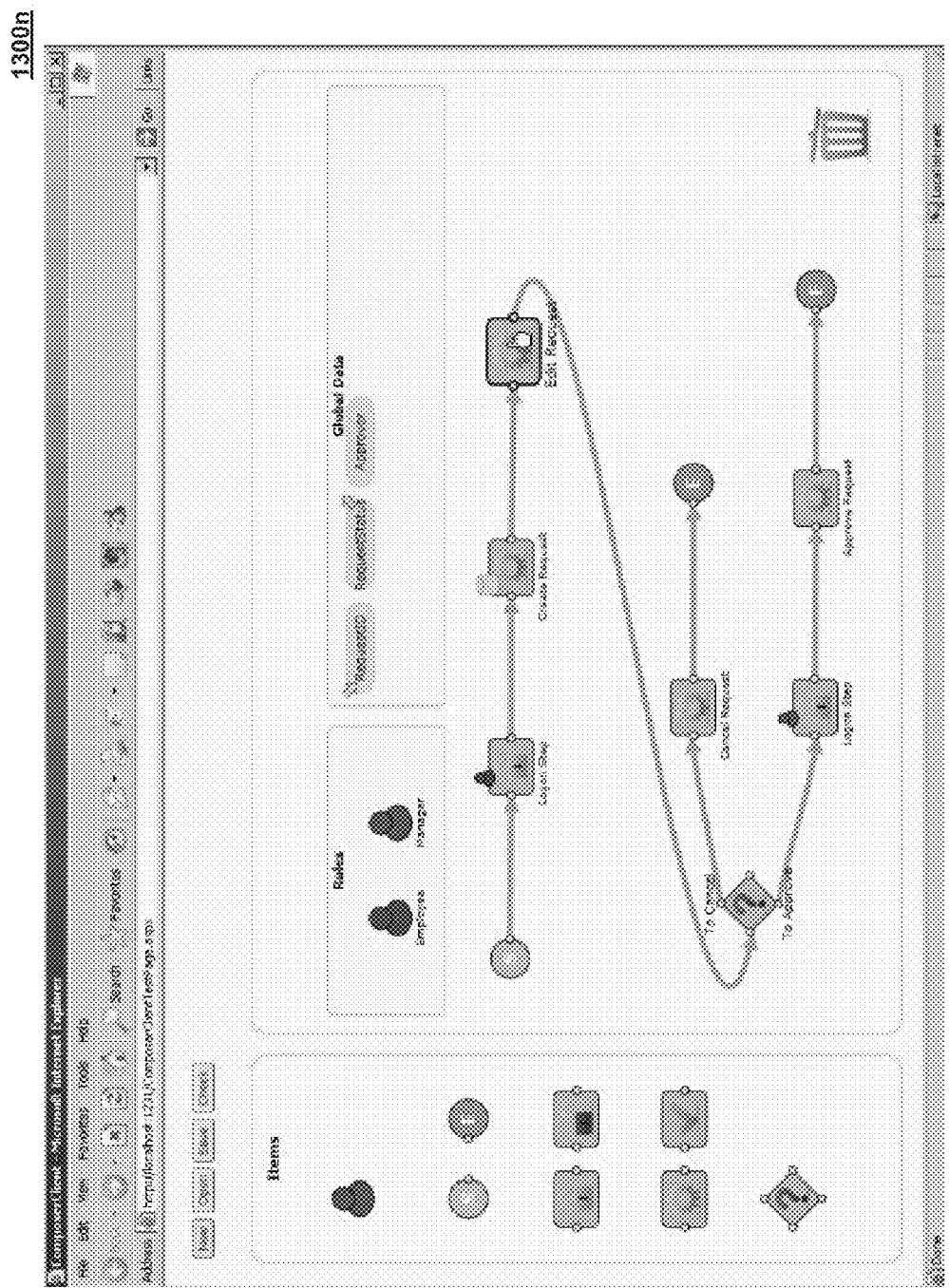
Figure 13O:
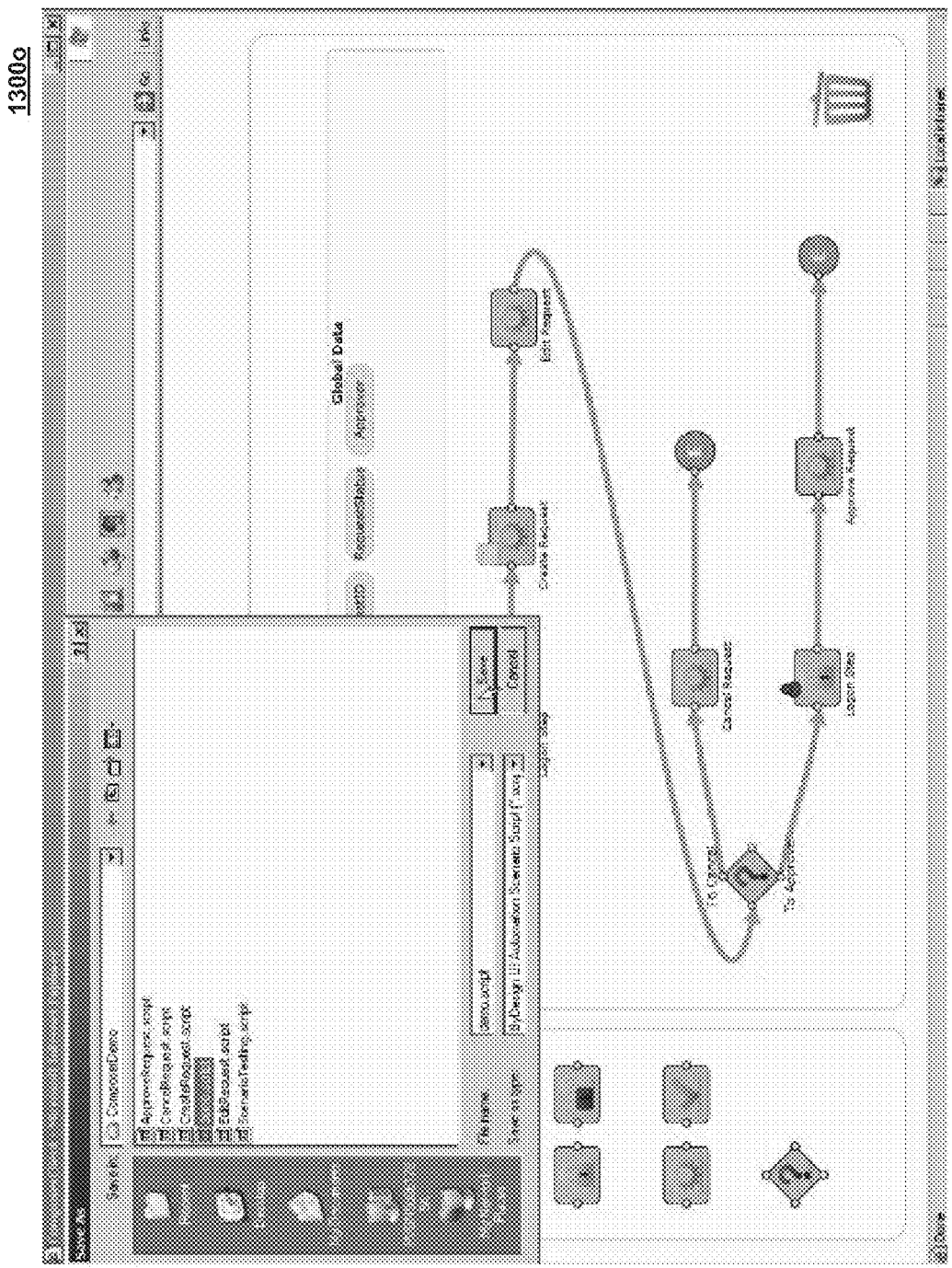

FIGS. 13a-13o are screen shots illustrating an example display view of an automation center displaying an example scenario generation in the example script composer engine 150. In the example of FIG. 13a, a user is generating a new scenario. Similarly to FIG. 12, the display area includes an items area 1302, a roles area 1304, a data area 1306, and a scenario display area 1308. As shown in FIG. 13a, the user has selected and included a start symbol and an end symbol in the current scenario.

FIG. 13b is a screen shot illustrating entry of data associated with the user adding a new script element to the current scenario. As shown in FIG. 13b, the user is entering a name of "Create Request" into a name field in a template for obtaining information to be associated with the script. In FIG. 13c, the user has indicated a path for retrieving an already-existing script to be associated with the new script element. A data area indicates that a data element "RequestID" is associated with the script, and an arrow displayed as going out of the script element indicates that "RequestID" is an output of the script "Create Request." Thus, the user may expect that execution of the script would result in a request for an ID.

When providing a script to be associated with the script element, the user may elect to dynamically open a host application 116 (e.g., an application for requesting employee leave time) and record a script via the recorder engine 152, or the user may manually enter a script and save it to a file for later retrieval by the scenario.

In FIG. 13d, the user selects a file for the data to be associated with the script. In FIG. 13e, the user selects input data that is type variant. In this example, the user is setting up a request by an employee for leave time. The request may require the employee to enter a specific type of leave request (e.g., a status of personal leave, sick leave, etc.), and the user may specify which types may be permitted by the script.

FIG. 13*f* is a screen shot illustrating the status of the generated scenario as the user adds another script step. The user may drag a cursor on the display from the script element "Create Request" to the new script element to indicate the flow of desired execution of the scenario from one element to the next, as indicated by an arrow flowing from the previous element to the next element on the display area.

FIG. 13*g* is a screen shot illustrating the user providing information related to the newly requested script element. As shown in FIG. 13*g*, the user provides a name "Edit Script" and provides a path for retrieval of an already-existing script to be associated with the scenario element. As shown in FIG. 13*g*, the script element "Edit Script" is associated with an output data element "RequestID" and an output data element "RequestStatus," as set up previously by the user, and as indicated by arrows coming out of the script element in the display.

FIG. 13*h* is a screen shot illustrating a request for information to be associated with a conditional scenario element after the user has inserted a new conditional element in the generated scenario. As shown in FIG. 13*h*, the user may provide several branch names and conditions for the respective branches from the conditional element. As shown in FIG. 13*h*, the user has connected the previous script element to the conditional element, indicating a flow of execution from the previous script element to the conditional element.

FIG. 13*i* is a screen shot illustrating conditions entered by the user for the conditional element. For example, the user may enter a branch to cancel the request is outdated. The user may enter a branch to process the request if the request satisfies a condition of "new or in process".

FIG. 13*j* is a screen shot illustrating a user addition of a new script element for the "cancel" branch of the conditional element discussed above. As shown in FIG. 13*j*, the new script element is associated by the user with an already-existing script (to be retrieved from a path indicated in an input template). As shown in FIG. 13*j*, the new script "CancelRequest" is associated with an input data element "RequestID" and an output data element "RequestStatus."

FIG. 13*k* is a screen shot illustrating a status of the generated scenario after the user has connected (via the cursor) the conditional element to the "CancelRequest" script element, and has added a new logon element, and has associated a role of "Manager" to the new logon step. For example, this may indicate to the user that a manager may need to log in to approve the request. The manager role may be assigned to the element by dragging a "Manager" graphical display element from the "Roles" area of the display to the login element.

FIG. 13*l* is a screen shot illustrating user entries in associating data with a new script element that the user has inserted into the scenario after the manager login element. As shown in FIG. 13*l*, the user provides a name "Approve Request" to the new script, and provides a path for retrieving an already-existing script. As shown in FIG. 13*l*, the script element "Approve Request" is associated with an input data element "RequestID", an output data element "RequestStatus", and an output data element "Approvor."

FIG. 13*m* is a screen shot illustrating the completed scenario after the user has connected the manager login to the "Approve Request" element. As shown in FIG. 13*m*, data associated with scenario elements is indicated in the data area displayed above the scenario display area.

FIG. 13*n* is a screen shot illustrating a mouse-over of an example scenario element. As shown in FIG. 13*n*, the user moves a cursor over a script element "Edit Request" in the scenario display area, and data elements associated with the script element are shown in the data area indicating inputs and output attributes, as the data element is used by the scrolled-over script element. As shown in FIG. 13*n*, the data element "RequestID" is input to the script element, and the data element "RequestStatus" is an output from the script element. This capability to scroll over elements and observe the input-output attributes of associated data elements may provide the user with a more efficient means of determining whether data attributes need to be changed, while viewing a graphical display of the scenario string.

FIG. 13*o* is a screen shot of a user saving the scenario during the generation of the scenario. The scenario may be saved either to the backend device 108 or the client frontend device 106, for later retrieval.

As described, the techniques of the present description may be provided to enable users to generate and test scripts and scenarios for testing user interfaces in a lean stack client frontend environment.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for executing instructions stored on a non-transitory computer readable storage medium, the method comprising:
    initiating execution of a host software application implementing one or more business processes and providing a graphical display associated with a user interface (UI) for a user in a client program executing on a client frontend device that is separate from a backend device storing metadata associated with the UI;
    displaying an automation graphical symbol within the graphical display providing the user with an option to initiate a test on one or more events of the host software application, during execution of the host software application;
    receiving a request from the user, via an action associated with the automation graphical symbol, to initiate a test on one or more events of the host software application;
    receiving information from the user indicating one or more selected specific events for performing the test and receiving a request from the user to record one or more events occurring during execution of the host software application;
    initiating the test on the selected specific events, based on a state of execution of the host software application at an initial time of the user indicating the selected specific events for performing the test;
    requesting storage of the recorded events as a script in a script database located at the backend device;
    requesting storage of data associated with the recorded events at the time of recording the respective events;
    retrieving the script of recorded events and the data associated with the recorded events from a script database located at the backend device; and
    initiating execution of the script to generate test results for the user.

2. The computer-implemented method of claim 1 wherein initiating execution of a host software application comprises:
    initiating execution of the software application implementing one or more business processes and providing a graphical display associated with a user interface (UI) for a user in a client program including a browser, the host software application executing in one of Silverlight, Flash, Java, and ASP.NET on a client frontend device.

3. The computer-implemented method of claim 1 wherein initiating execution of a host software application comprises:
    receiving a model of the UI from a metadata repository located at the backend device; and
    interpreting the model of the UI for execution by the client program.

4. The computer-implemented method of claim 1 wherein receiving information from the user indicating one or more selected specific events comprises:
    receiving a request to retrieve from a script database located on the backend device one or more scripts that include events that occur during execution of the host software application and data associated with the events.

5. The computer-implemented method of claim 1 further comprising:
    determining whether the selected specific events raise one or more error conditions; and
    displaying error messages associated with determined error conditions.

6. A system having at least one processor comprising:
    a user interface manager configured to initiate execution of a host software application implementing one or more business processes and providing a graphical display associated with a user interface (UI) for a user in a client program executing on a client frontend device that is separate from a backend device storing metadata associated with the UI;
    an automation trigger display engine configured to display an automation graphical symbol within the graphical display providing the user with an option to initiate a test on one or more events of the host software application, during execution of the host software application;
    an automation controller input engine configured to receive a request from the user, via an action associated with the automation graphical symbol, to initiate a test on one or more events of the host software application;
    an event selection engine configured to receive information from the user indicating one or more selected specific events for performing the test and to receive a request from the user to record one or more events occurring during execution of the host software application; and
    an automation explorer engine configured to:
        initiate the test on the selected specific events, based on a state of execution of the host software application at an initial time of the user indicating the selected specific events for performing the test,
        request storage of the recorded events as a script in a script database located at the backend device,
        request storage of data associated with the recorded events at the time of recording the respective events,
        retrieve the script of recorded events and the data associated with the recorded events from a script database located at the backend device, and
        initiate execution of the script to generate test results for the user.

7. The system of claim 6 wherein:
    the user interface manager is configured to initiate execution of the host software application implementing one or more business processes and providing a graphical display associated with the user interface (UI) for the user in a client program including a browser, the host software application executing in one of Silverlight, Flash, Java, and ASP.NET on the client frontend device.

8. The system of claim 6 wherein:
the user interface manager is configured to:
- receive a model of the UI from a metadata repository located at the backend device; and
- interpret the model of the UI for execution by the client program.

9. The system of claim 6 wherein the event selection engine is configured to receive a request to retrieve from a script database located on the backend device one or more scripts that include events that occur during execution of the host software application and data associated with the events.

10. A computer program product tangibly embodied on a non-transitory computer-readable medium and including executable code that, when executed, is configured to cause at least one data processing apparatus to:
- initiate execution of a host software application implementing one or more business processes and providing a graphical display associated with a user interface (UI) for a user in a client program executing on a client frontend device that is separate from a backend device storing metadata associated with the UI;
- display an automation graphical symbol within the graphical display providing the user with an option to initiate a test on one or more events of the host software application, during execution of the host software application;
- receive a request from the user, via an action associated with the automation graphical symbol, to initiate a test on one or more events of the host software application;
- receive information from the user indicating one or more selected specific events for performing the test and receive a request from the user to record one or more events occurring during execution of the host software application;
- initiate the test on the selected specific events, based on a state of execution of the host software application at an initial time of the user indicating the selected specific events for performing the test;
- request storage of the recorded events as a script in a script database located at the backend device;
- request storage of data associated with the recorded events at the time of recording the respective events;
- retrieve the script of recorded events and the data associated with the recorded events from a script database located at the backend device; and
- initiate execution of the script to generate test results for the user.

11. The computer program product of claim 10 wherein initiating execution of a host software application comprises:
- initiating execution of the software application implementing one or more business processes and providing a graphical display associated with a user interface (UI) for a user in a client program including a browser, the host software application executing in one of Silverlight, Flash, Java, and ASP.NET on a client frontend device.

12. The computer program product of claim 10 wherein initiating execution of a host software application comprises:
- receiving a model of the UI from a metadata repository located at the backend device; and
- interpreting the model of the UI for execution by the client program.

13. The computer program product of claim 10 wherein receiving information from the user indicating one or more selected specific events comprises:
- receiving a request to retrieve from a script database located on the backend device one or more scripts that include events that occur during execution of the host software application and data associated with the events.

14. The computer program product of claim 10 wherein the executable code, when executed, is configured to cause the at least one data processing apparatus to:
- determine whether the selected specific events raise one or more error conditions; and
- display error messages associated with determined error conditions.

* * * * *